(12) United States Patent
Kumagai et al.

(10) Patent No.: US 8,395,327 B2
(45) Date of Patent: Mar. 12, 2013

(54) HIGH-PRESSURE DISCHARGE LAMP LIGHTING DEVICE AND LIGHTING FIXTURE USING THE SAME

(75) Inventors: Jun Kumagai, Kadoma (JP); Satoru Nagata, Kobe (JP); Keisuke Sato, Hirakata (JP); Naoki Komatsu, Kobe (JP)

(73) Assignee: Panasonic Corporation, Osaka (JP)

( * ) Notice: Subject to any disclaimer, the term of this patent is extended or adjusted under 35 U.S.C. 154(b) by 290 days.

(21) Appl. No.: 12/373,387

(22) PCT Filed: Apr. 19, 2007

(86) PCT No.: PCT/JP2007/058534
§ 371 (c)(1),
(2), (4) Date: Jan. 12, 2009

(87) PCT Pub. No.: WO2008/023476
PCT Pub. Date: Feb. 28, 2008

(65) Prior Publication Data
US 2009/0315470 A1 Dec. 24, 2009

(30) Foreign Application Priority Data
Aug. 23, 2006 (JP) .................................. 2006-226834

(51) Int. Cl.
*H05B 41/282* (2006.01)
(52) U.S. Cl. ..................... 315/224; 315/291; 315/209 R
(58) Field of Classification Search .................. 315/360, 315/224–226, 291, 209 R, 219, 227 R, 289, 315/276, 307
See application file for complete search history.

(56) References Cited

U.S. PATENT DOCUMENTS

| | | | | |
|---|---|---|---|---|
| 4,912,374 A | * | 3/1990 | Nagase et al. | 315/244 |
| 5,491,386 A | * | 2/1996 | Eriguchi et al. | 315/209 R |
| 5,932,976 A | * | 8/1999 | Maheshwari et al. | 315/291 |
| 6,593,703 B2 | * | 7/2003 | Sun | 315/224 |
| 6,674,249 B1 | | 1/2004 | Leskovec | |
| 7,129,650 B2 | | 10/2006 | Komatsu et al. | |

(Continued)

FOREIGN PATENT DOCUMENTS

| | | |
|---|---|---|
| CA | 2108418 | 5/1994 |
| JP | 60-250599 A | 12/1985 |

(Continued)

OTHER PUBLICATIONS

Canada Office action, mail date is Mar. 8, 2011.

(Continued)

*Primary Examiner* — Crystal L Hammond
(74) *Attorney, Agent, or Firm* — Greenblum & Bernstein, P.L.C.

(57) ABSTRACT

A high-pressure discharge lamp lighting device includes: a power converter circuit which includes a plurality of switching elements and an inductance element, converts an input from a DC power supply, and supplies a rectangular wave AC output to a high-pressure discharge lamp; and a control circuit which controls the switching elements of the power converter circuit. The control circuit performs first lighting control in which the switching elements of the power converter circuit are controlled in order to supply a current to a peak value for each switching cycle, and performs second lighting control in which desired power is supplied during steadily lighting state of the high-pressure discharge lamp; and the first lighting control and the second lighting control are switched over in response to a lighting state of the high-pressure discharge lamp.

10 Claims, 20 Drawing Sheets

U.S. PATENT DOCUMENTS

| | | | |
|---|---|---|---|
| 7,141,937 B2 * | 11/2006 | Kumagai et al. | 315/224 |
| 7,315,133 B2 * | 1/2008 | Suzuki | 315/209 R |
| 2003/0222594 A1 * | 12/2003 | Mita | 315/224 |
| 2004/0251852 A1 | 12/2004 | Kambara et al. | |
| 2006/0049777 A1 * | 3/2006 | Kumagai et al. | 315/224 |
| 2006/0108949 A1 * | 5/2006 | Suzuki et al. | 315/291 |
| 2007/0138975 A1 | 6/2007 | Suganuma et al. | |
| 2007/0210723 A1 | 9/2007 | Kumagai et al. | |

FOREIGN PATENT DOCUMENTS

| | | |
|---|---|---|
| JP | 3-124591 U | 12/1991 |
| JP | 7-114993 A | 5/1995 |
| JP | 7-230883 A | 8/1995 |
| JP | 2001-313193 A | 11/2001 |
| JP | 2002-352987 A | 12/2002 |
| JP | 2003-031393 A | 1/2003 |
| JP | 2003-217888 A | 7/2003 |
| JP | 2005-019337 A | 1/2005 |
| JP | 2005-190927 A | 7/2005 |
| JP | 2006-147363 A | 6/2006 |

OTHER PUBLICATIONS

Canada Office action, mail date is Apr. 18, 2012.
Japan Office action, dated May 8, 2012 along with an english translation thereof.
English language Abstract of JP 2006-147363 A.
English language Abstract of JP 2005-190927 A.
English language Abstract of JP 2005-019337 A.
English language Abstract of JP 2001-313193 A.
English language Abstract of JP 2002-352987 A.
English language Abstract of JP 7-114993 A.
English language Abstract of JP 2003-031393 A.
English language Abstract of JP 2003-217888 A.
English language Abstract of JP 7-230883 A.
English language Abstract of JP 60-250599 A.

* cited by examiner

HIGH-PRESSURE DISCHARGE LAMP LIGHTING DEVICE AND LIGHTING FIXTURE USING THE SAME

TECHNICAL FIELD

This invention relates to a high-pressure discharge lamp lighting device and a lighting fixture using the same.

BACKGROUND ART

A high-pressure discharge lamp tends to suffer from unstable discharge immediately after it is triggered or when it comes close to the end of its lifetime. It is well known that the discharge lamp may blink, or fade out in the worst case even if a lighting device supplies power.

As shown in FIG. 21 of the accompanying drawing figures, rectification discharge is known as one of causes of the foregoing problems. With the rectification discharge, emission of electrons between a pair of electrodes of an AC-activated discharge lamp becomes asymmetric in anodic and cathodic cycles. This is caused by unreliable formation of so-called luminescent spots, i.e. unstable discharge of thermal electrons, since one electrode in the cathodic cycle cannot shift to arc discharge from glow discharge. Such a phenomenon is somewhat inevitable to the discharge lamp. In the case shown in FIG. 21, it is known that an electrode 1 cannot sufficiently discharge electrons in the cathodic cycle.

It is conceivable that the unstable state of the luminescent spots of the electrodes are triggered because the electrodes or radioactive substances in electrons are exhausted, or because discharging functions of the discharge lamp become unstable due to impurities.

In any case, the discharge lamp suffers from increased impedance, and blinks or fades out due to insufficient power of the lighting device if no countermeasures are taken.

Further, there is a phenomenon in which the discharge lamp is turned on once, and transiently and abruptly increases its impedance. Especially, this phenomenon is remarkable with a so-called metal halide lamp in which a metal halogen compound is sealed in a discharge tube of the discharge lamp as a light-emitting substance. Specifically, the phenomenon is observed when the discharge lamp is in a startup mode and when it is in a steadily lighting mode.

The foregoing phenomena will be described with respect to behavior of the metal halide lamp. In the startup mode, the lamp is triggered by simultaneous dielectric breakdown of the light emitting substances and a combination of inert gases and mercury vapors, both of which are sealed in a discharge tube. In this state, the metal halogen compound has a low vapor pressure, and hardly contributes to discharge.

Thereafter, electric power is applied to the discharge tube for several minutes. When the discharge tube becomes hot, the light emitting substance becomes loose, the vapor pressure of the metal is raised, and a lamp voltage is increased.

What is unexpected in the foregoing process is that the vapor pressure of the metal is raised instantly and abruptly if the light emitting substance is present at an unstable spot, e.g. near a hot electrode, and comes into contact with the hot electrode. In such a case, if a magnetic ballast whose power supply performance depends upon the commercial power supply, a voltage of the lamp exceeds an output of the ballast, so that the lamp fades out. A similar phenomenon is observable when the commercial power supply is interrupted in a split second and when the commercial power supply voltage is instantly decreased.

On the other hand, an electronic ballast includes a so-called inverter circuit which lights the lamp with the rectangular wave AC, and controls lamp power to be approximately constant. If the lamp voltage varies as stated above, a lamp current is reduced. As a result, the lamp impedance is transiently raised, which makes the lamp fade out. Referring to FIG. 22, the lamp voltage is abruptly raised from a value at an operation point 1 to a value at an operation point 2.

Further, there is another reason for the increase of the lamp voltage. For instance, even a good lamp may suffer from an increased voltage with a lapse of time. This is caused by chemical reactions of the substance sealed in the lamp, or release of impurities. This phenomenon is essentially inevitable, and leads to the foregoing phenomena.

The following describe behavior of the ballast. With the ballast used for an AC-powered discharge lamp, a lamp current is turned off once each time polarity reversal is performed in a half cycle. In order to restart the lamp in a next half cycle, the lamp voltage from the ballast is supplied first while the lamp current which is emission of thermal electrons of the electrodes is supplied after a while. Therefore, impedance is transiently increased as shown by a white circle. The white circle denotes a transient value of the high impedance in the half cycle.

When the lamp is activated by the commercial power having sine waves with delayed rising edges, the lamp voltage becomes a so-called re-striking voltage which is abruptly raised after the zero-cross. This makes the lamp fade out when the power supply voltage becomes insufficient.

On the other hand, with a rectangular wave inverter circuit whose waveform quickly rises, an output voltage can be advantageously controlled to be constant. However, when the lamp voltage is also controlled to be approximately constant, the lamp current is decreased in spite of the increase of the lamp voltage. Referring to FIG. 24, the lamp impedance is transiently raised, which causes the lamp to fade out. In FIG. 24, the lamp is operated at an operation point 2' where the lamp voltage is increased when an ideal power source (a constant voltage source, for example) is used. However, the impedance is raised to the value at the operation point 2 along an output line of the constant power supply.

Japanese Patent Laid-Open Publication No. Sho 60-250599 discloses a discharge lamp lighting device, which includes a DC-DC converter having current limiting characteristics, and a rectangular wave inverter converting an output of the DC-DC converter into a rectangular wave AC. The discharge lamp lighting device supplies the output of the rectangular wave inverter to the discharge lamp via a high voltage pulse superimposing circuit. The discharge lamp lighting device controls current limiting characteristics in response to detected output values of the DC-DC converter, output current and discharge tube voltage. However, the lighting device does not control the current flowing to switching elements to a predetermined peak value in each switching cycle when the discharge lamp tends to fade out.

In summary, the phenomena which cause unstable lighting and fading out of the discharge lamp are not favorable to the discharge lamp and the ballast for the following reasons.

(1) The lamp asymmetrically discharges.

(2) The lamp increases the impedance due to the transient behavior or aging.

(3) The ballast does not have a sufficient output (or power supply performance).

An electric model of the discharge lamp will be reviewed hereinafter.

FIG. 25 is a graph showing voltage-current characteristics of the discharge lamp from its startup mode till its steadily lighting mode. For convenience sake, the voltage-current characteristics per half cycle are depicted.

At an operation point (a), the discharge lamp undergoes voltage breakdown by high voltage pulses coming from outside. In this state, the discharge lamp remains in a transient state between the glow discharge and the arc discharge, and has high impedance.

When an appropriate ballast output is supplied, the lamp changes to a mode shown at an operation point (b) where the lamp is quasi-stable. In this state, the discharge lamp has undergone current breakdown, but maintains a high lamp voltage, and has impedance which is not lowered completely.

Next, when a ballast output which can apply an approximately rated current, the lamp completely changes its state to a state shown at to an operation point (c) where the impedance and a voltage are low, and a lamp current is large.

Thereafter, the lamp voltage gradually increases as shown by an output curve of the ballast. The lamp becomes stable at a rated operation point (d) along with an increase of the impedance.

When the lamp is new, it becomes stable at the operation point (d) each time it is lit. With a lapse of time, the lamp gradually increases its voltage as shown at operation points (d')→(d")→(d"').

In FIG. 26, the lamp voltage is in a normal range at the operation points (d') to (d") while it is abnormal at the operation point (d"').

The lamp impedance is variable as shown by dashed lines.

Further, the lamp is assumed to be in operation with a constant current between the operation points (c) and (d"').

In order to overcome the foregoing problems, it is necessary to apply optimum ballast outputs at the respective operation points (a)→(b)→(c)→(d)→(d')→(d")→(d"').

The present invention has been contemplated in order to overcome problems of the related art, and is intended to provide a high-pressure discharge lamp lighting device which can protect a discharge lamp against unstable lighting and fading out from the startup till the end of life.

DISCLOSURE OF INVENTION

Referring to FIG. 1, a high voltage discharge lamp lighting device includes: a power converter circuit 3 which includes a plurality of switching elements Q2 to Q6 and an inductance element L2, converts an input from a DC power supply 2, and supplies a rectangular wave AC output to a high-pressure discharge lamp DL; and a control circuit 9 which controls the switching elements Q2 to Q6 of the power converter circuit 3. The control circuit 9 performs first lighting control in which the switching elements Q2 to Q6 of the power converter circuit 3 are controlled in order to supply a current to a peak value for each switching cycle, and performs second lighting control in which desired power is supplied during steadily lighting state of the high-pressure discharge lamp DL; and the first lighting control and the second lighting control are switched over in response to a lighting state of the high-pressure discharge lamp DL.

BEST MODE FOR CARRYING OUT THE INVENTION

The invention will be described hereinafter on the basis of the concept of the operation points of the discharge lamp referred to above. Usually, a discharge lamp suffers from unstable lighting and fading out due to the three problems described above. The inventors of the invention have discovered that the problems can be solved by actively controlling output characteristics of the ballast.

Figure 26:
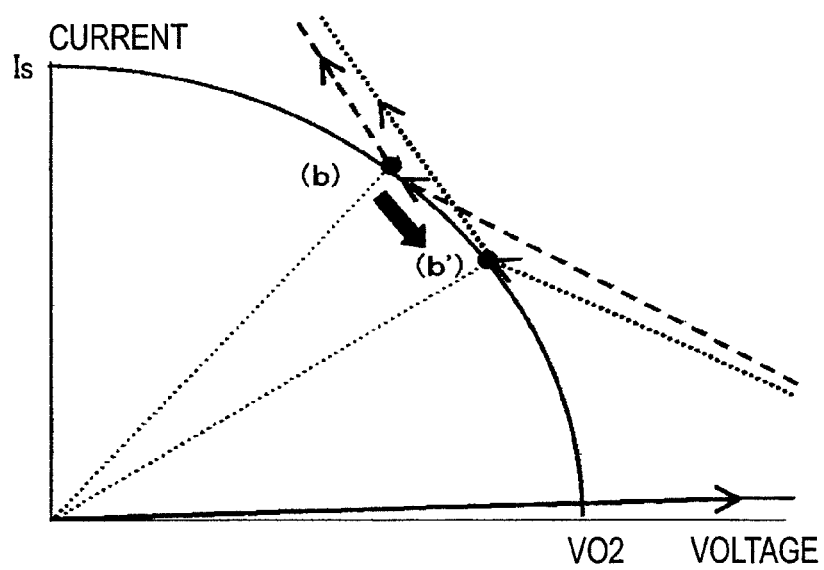
FIG. 26 is a chart explaining output characteristics of a ballast of the related art.

For instance, referring to the output characteristics shown in FIG. 26, the stable operation point (b) is lowered to the low current point (b'), or there is no intersection in response to a slight change of the lamp impedance. As a result, the lamp will fade out. In FIG. 26, the output characteristics of the ballast are depicted as voltage—current characteristics linking an open voltage VO2 and a short-circuit current Is.

Figure 27:
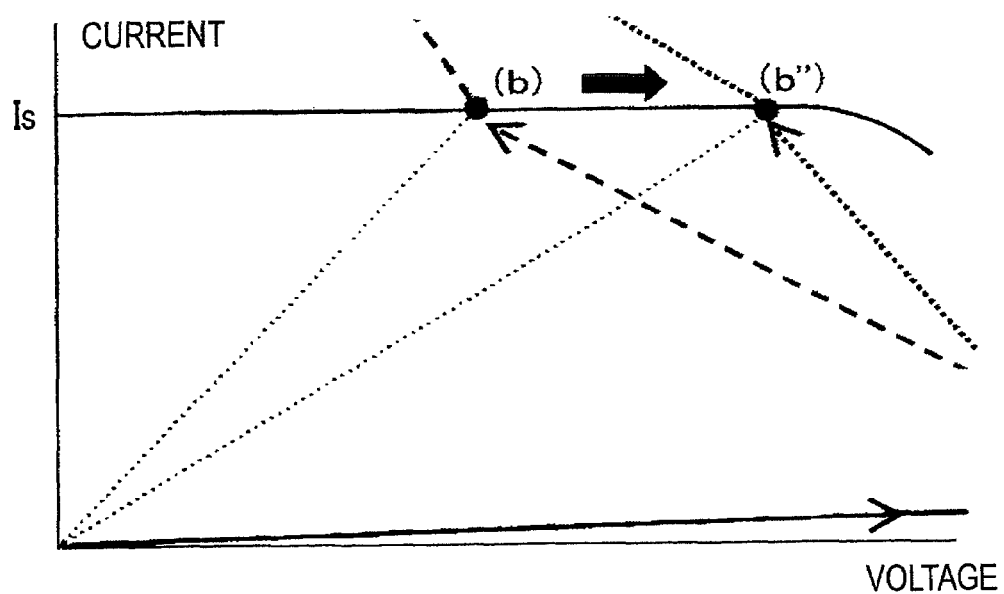
FIG. 27 is a further chart explaining output characteristics of a ballast of the related art.

Taking unpredictable behavior of the lamp into consideration, it is preferable that the state of the lamp at the operation point (b) should be stabilized based on the output characteristics of the ballast. Specifically, it is preferable that the operation point (b) should be moved to the operation point (b") shown in FIG. 27, for instance, so that an intersection is present in a more stable operation region.

Figure 28:
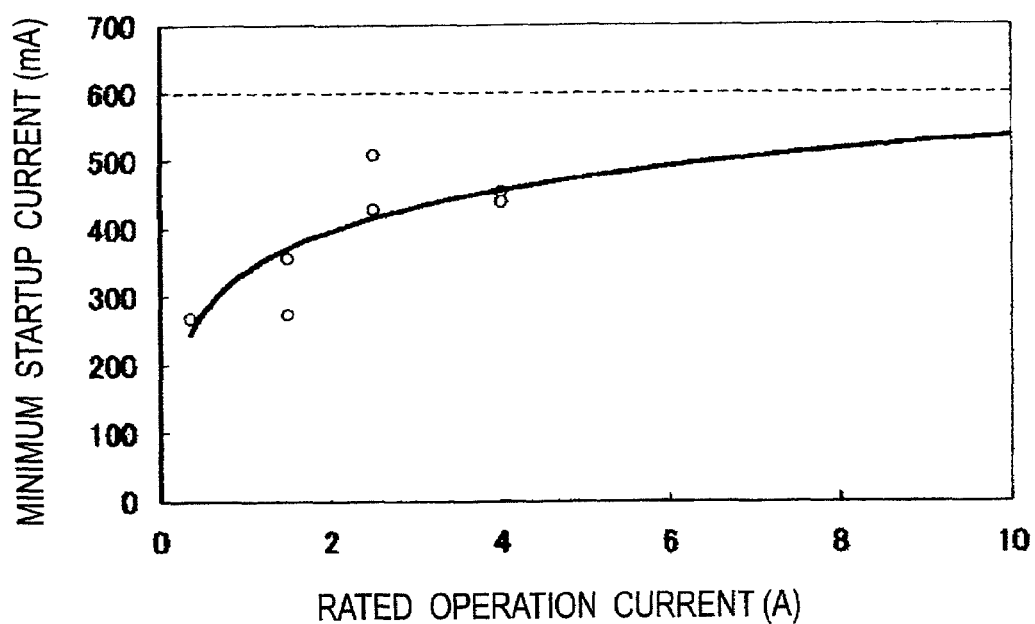
FIG. 28 shows the relationship between a rated lamp operation current and a minimum initial operation current of the related art.

The inventors have tested that a minimum current required at the operation point (b) may be equal to or larger than 600 mA (refer to FIG. 28). In FIG. 28, white circles denote a variety of lamps, the abscissa denotes a rated operating current, and the ordinate denotes a minimum current (mA) necessary for triggering the lamps.

If the power is controlled to be constant in a mode between the operation point (b) and the operation point (c), a lamp which has changed its glow discharge to the arc discharge becomes unstable again. In this state, it is necessary to let the lamp have low impedance.

Figure 29:
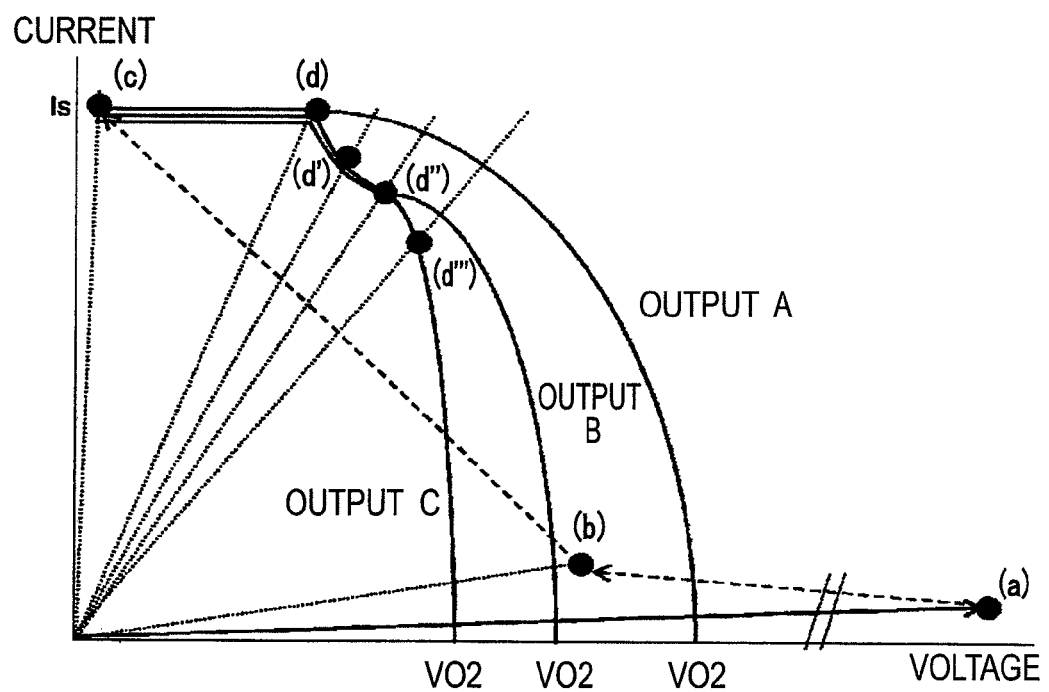
FIG. 29 is a chart explaining output characteristics of a ballast of the related art.

When the lamp is confirmed to be out of the unstable state between the operation point (c) and the operation point (d"), constant current or power control may be performed as shown by a characteristic curve B in FIG. 29. Specifically, the current is controlled to be constant in the mode between the operation point (c) and the operation point (d) while the power is controlled to be constant between the operation point (d) and the operation point (d").

Finally, between the operation point (d") and the operation point (d''') or the final life stage, the lamp increases its impedance. In this state, it is not preferable to apply unnecessary power to the lamp, which may damage or overheat the discharge lamp or the ballast. Therefore, it is effective to cut off an output which has a voltage above the constant voltage as shown by a characteristic curve C in FIG. 29 or not to apply the power above the predetermined value, so that the lamp will naturally fade out.

Specific embodiments for carrying out the foregoing operations will be described hereinafter.

First Embodiment

Figure 1:
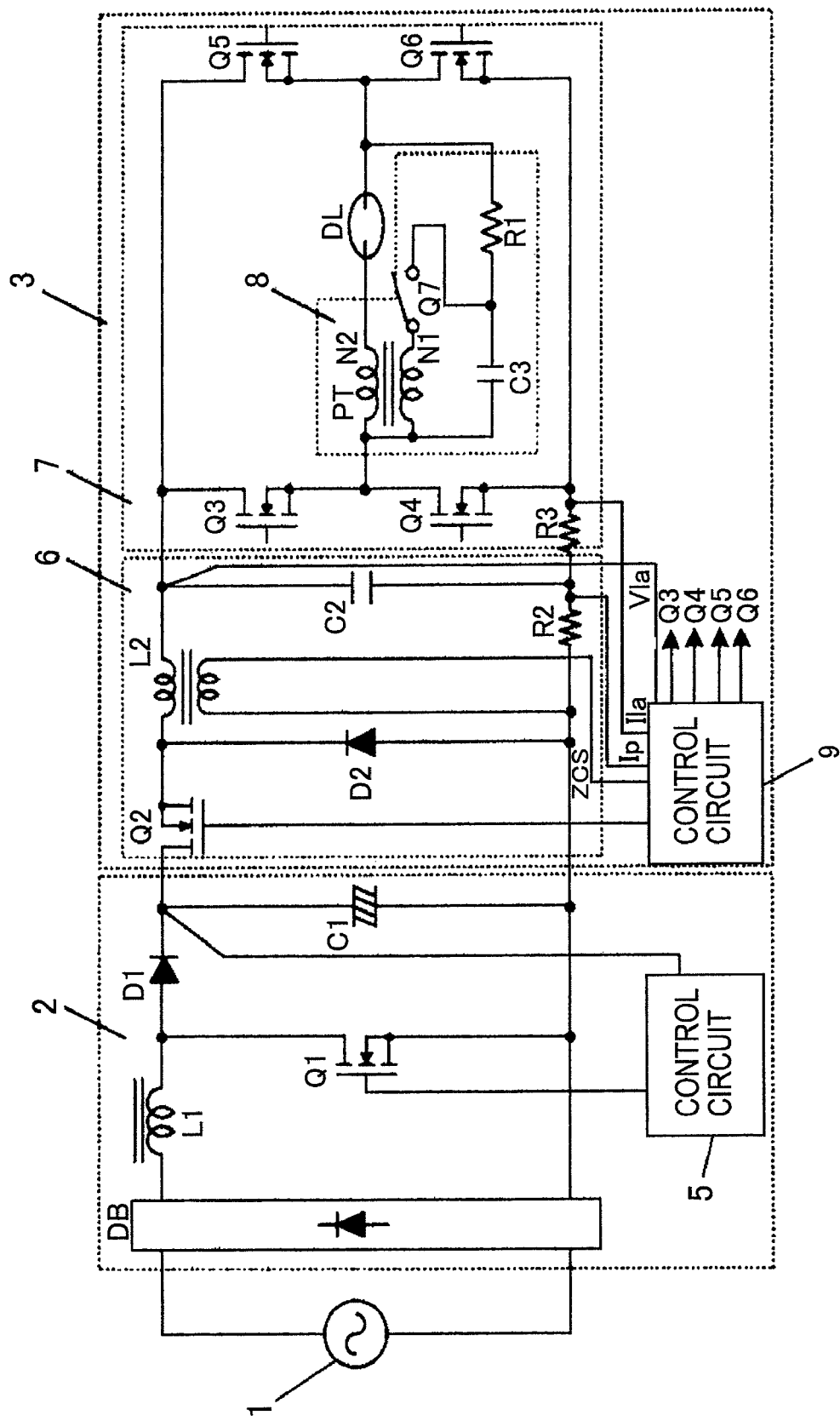
FIG. 1 is a circuit diagram of a discharge lamp lighting device in a first embodiment of the invention.

FIG. 1 is a circuit diagram of a discharge lamp lighting device in a first embodiment of the invention. In FIG. 1, reference numeral 1 denotes an AC power supply, reference numeral 2 denotes a DC power supply circuit, and reference numeral 3 denotes a power converter circuit. The DC power supply circuit 2 includes: a rectifier DB for full-wave rectification of the AC power source 1; a booster chopper circuit which is constituted by an inductor L1, a switching element Q1, a diode D1 and a capacitor C1; and a control circuit 5 for the booster chopper circuit. An AC input from the AC power source 1 is converted into a DC output, which is supplied to the power converter circuit 3. Further, the control circuit 5 performs power factor improvement control for the circuits of the lighting device so that the lighting circuit becomes more resistive and so that the input current and the input voltage do not suffer from a phase lag. For instance, the control circuit 5 for the switching element Q1 may be realized by a commercially available MC33262 manufactured by on-semi Co., Ltd.

The power converter circuit 3 includes a step-down chopper circuit 6, an inverter circuit 7, an igniter circuit 8, and a control circuit 9. The step-down chopper circuit 6 includes a switching element Q2, a diode D2, an inductor L2, and a capacitor C2. The step-down chopper circuit 6 reduces an input voltage, and outputs a DC voltage. The operation of the step-down chopper circuit 6 is well-known, and will not be described here. The step-down chopper circuit 6 controls the operation of the switching element Q2, and serves as a ballast which controls power supplied to a discharge lamp DL.

The inverter circuit 7 is a full-bridge circuit constituted by switching elements Q3 to Q6. In the inverter circuit 7, a pair of switching elements Q3 and Q6 and a pair of switching element Q4 and Q5 are alternately turned on and off in response to control signals from the control circuit 9 at several ten to several hundred Hertz frequency, so that rectangular wave AC power is supplied to the discharge lamp DL.

The igniter circuit 8 includes a pulse transformer PT, a capacitor C3, a switching element Q7 (e.g. a voltage responsive element such as SIDAC, and a resistor R1. The operation of the igniter circuit 8 will be briefly described hereinafter. Receiving the rectangular wave voltage generated by the inverter circuit 7, the capacitor C3 is gradually charged in accordance with its time constant and a time constant of the resistor R1. When a voltage Vc3 of the capacitor C3 becomes equal to a breakover voltage Vbo in a no load period, the switching element Q7 is activated. Charges accumulated in the capacitor C3 are discharged via the switching element Q7, and a primary coil N1 of the pulse transformer PT. A pulse voltage generated in the primary coil N1 of the pulse transformer PT is raised, so that a high pulse voltage (of several KV) is generated in a secondary coil N2 of the pulse transformer PT. In this state, the discharge lamp DL starts discharging in response to the high pulse voltage, and changes its state to a lighting mode.

The control circuit 9 detects a lamp voltage Vla of the discharge lamp DL, a lamp current Ila, a peak current Ip of the switching element Q2, and a zero-cross signal (ZCS) of a current flowing to the inductor L2. The control circuit 9 turns on or off the switching element Q2 on the basis of the detected results, and controls the operation of the switching element Q2 of the step-down chopper circuit 6 and the switching elements Q3 to Q6 of the inverter circuit 7, so that a desired current or power is supplied to the discharge lamp DL.

The discharge lamp DL is a high intensity-and-voltage discharge lamp (HID lamp) such as a metal halide lamp and a high-voltage mercury lamp.

Figure 2:
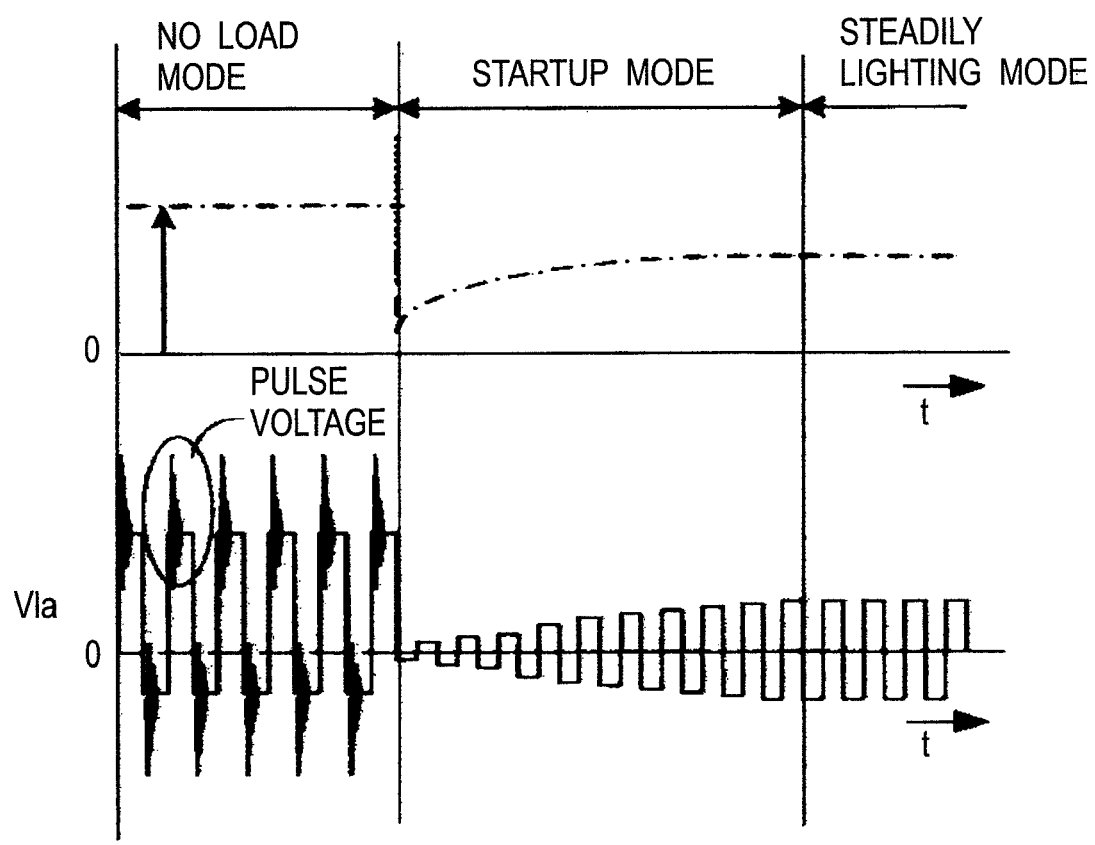
FIG. 2 is a diagram showing a process from a no load mode till a steadily lighting mode in the first embodiment of the invention.

Using the control circuit 9, the lighting device goes through roughly three modes as shown in FIG. 2 while the control circuit 9 controls the unlit mode of the discharge lamp, and puts the discharge lamp in a steady lighting mode.

No load mode: The discharge lamp remains unlit. The pulse voltage generated by the igniter circuit 8 is boosted to the primary and secondary coils N1 and N2 of the pulse transformer PT, is superimposed on a rectangular wave voltage, and is applied between electrodes of the discharge lamp.

In this state, the discharge lamp undergoes dielectric breakdown, and is put in a startup mode.

Startup Mode: After the dielectric breakdown, the discharge lamp starts arc discharge via glow discharge. The lamp voltage of several volts is gradually raised to a stable voltage in several minutes.

Steadily Lighting Mode: A temperature of the discharge tube is raised in several minutes after the discharge lamp is lit. The discharge lamp becomes steady, and the lamp voltage becomes approximately constant.

Figure 3:
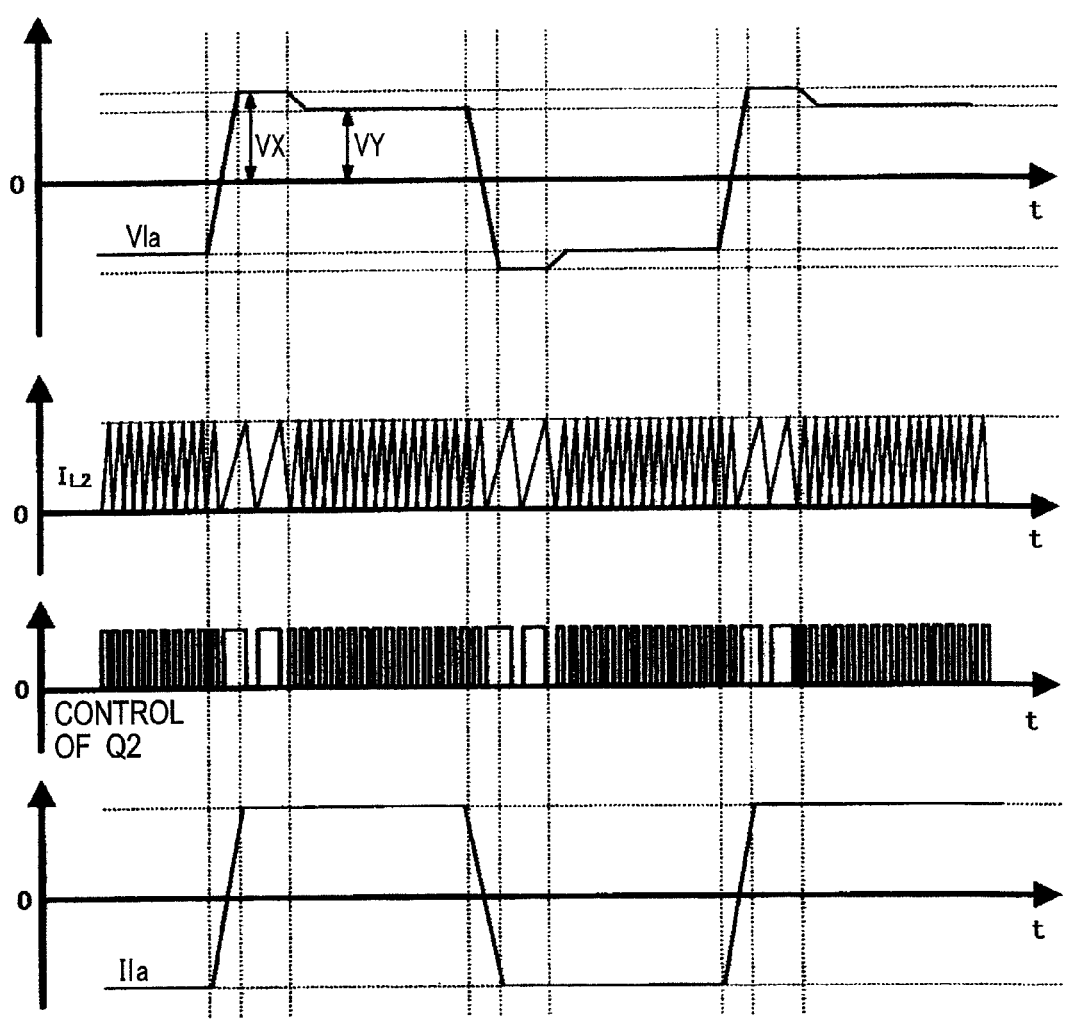
FIG. 3 shows waveforms of respective circuits during constant current control.

FIG. 3 shows operating waveforms of various circuits during the startup mode or the steadily lighting mode of the discharge lamp. The step-down chopper circuit 6 turns the switching element Q2 on and off in response to a PWM signal from the control circuit 9. In response to chopping of the switching element Q2, the step-down chopper circuit 6 generates a chopping wave $I_{L2}$ as shown in FIG. 3, and provides a load circuit with a rectangular current Ila which has been smoothed by the capacitor C2. The chopping wave $I_{L2}$ flows to the inductor L2, and gradually increases while the switching element Q2 is active, but gradually decreases while the switching element Q2 is inactive.

In the inverter circuit 7, the pair of switching elements Q3 and Q6 and the pair of switching elements Q4 and Q5 are alternately turned on in response to the control signals from the control circuit 9, so that the rectangular wave current Ila (shown in FIG. 3) is supplied to the discharge lamp DL, and a voltage Vla (shown in FIG. 3) is supplied to the opposite ends of the discharge lamp. Polarity reversal is carried out in a similar manner from the no load mode till the steady lighting mode. Alternatively, polarity reversal may be performed in a different manner during the no load mode and during the steadily lighting mode.

Figure 4:
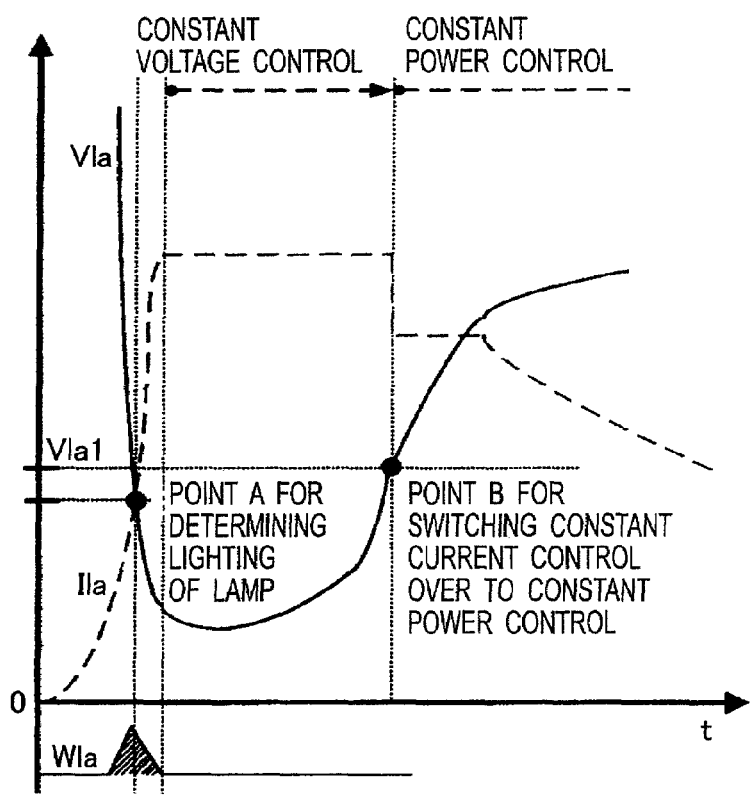
FIG. 4 is a chart showing variations of a lamp voltage from dielectric breakdown till a steadily light mode, and a control switching point in the first embodiment of the invention.

The control processes from the dielectric breakdown till the steadily lighting mode of the discharge lamp will be described in detail with reference to FIG. 4, in which the abscissa denotes a time axis.

<<Constant Current Control>>

Figure 5:
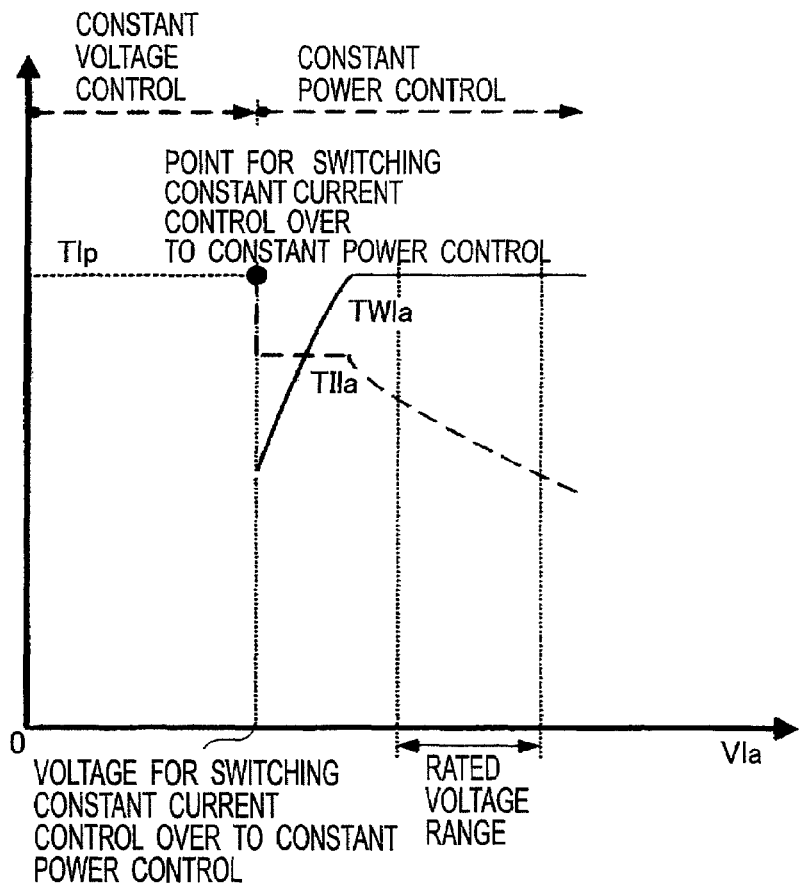
FIG. 5 is a characteristic diagram showing lamp power with respect to a lamp voltage, and a target control value of a lamp current.

Lamp power W1a, which is calculated using detected values of the lamp voltage Vla and lamp current Ila, is detected as a light discriminating point A. In this state, the discharge lamp is judged to be lit. From this time point, a peak of the current is controlled to be constant in order that a current having a magnitude Tip, which is a target value of a current curve shown in FIG. 5, is made to flow in each switching cycle of the switching element Q2.

To be more precise, when the switching element Q2 is turned on in response to a command from the control circuit 9, a current begins to flow to the inductor L2. The switching element Q2 is turned off when a current value Ip of the switching element Q2 which is detected by the current sensing resistor R2 becomes equal to the target value Tip (shown in FIG. 5). When the zero-cross signal ZCS is detected to be zero by the secondary coil of the inductor L2, the control circuit 9 outputs the signal to activate the switching element Q2. Thereafter, the foregoing operation will be repeated.

Figure 6:
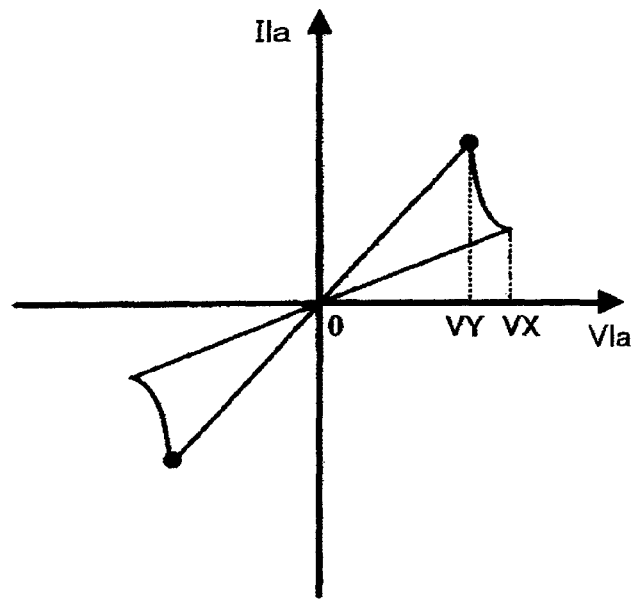
FIG. 6 explains behavior of the lamp voltage and the lamp current for each polarity reversal in the first embodiment.

FIG. 6 shows the relationship between the voltage Vla and the current Ila of the discharge lamp each time the polarity reversal is carried out. Referring to FIG. 3 and FIG. 6 in combination, it is known that when the substance sealed in the discharge lamp is unstable in the startup mode, a voltage VX is high, and the current Ila is slow to flow immediately after the polarity reversal.

Even immediately after the polarity reversal where the current is slow to flow, constant current control makes the current flow to the peak value, which can prevent the discharge lamp from fading out.

<<Constant Power Control>>

When the lamp voltage is raised to become equal to a predetermined voltage Vla1 (shown in FIG. 4), the constant current control is switched over to constant power control which is second control. In this power control mode, chopping of the switching element Q2 is controlled on the basis of a Vla–Twla curve shown in FIG. 5 each time the lamp voltage Vla is detected while the discharge lamp is active.

In the first embodiment, it is possible to reliably apply the necessary current even when the substance sealed in the discharge lamp is unstable at the startup of the discharge lamp, and especially even when the lamp impedance is increased immediately after the polarity reversal, and the current is slow to flow to the discharge lamp. Therefore, the discharge lamp can be reliably lit in response to each polarity reversal. Further, this embodiment can realize the high-pressure discharge lighting device in which the output voltage of the booster chopper circuit is reduced in order to make components have low withstand voltages.

Second Embodiment

Figure 7:
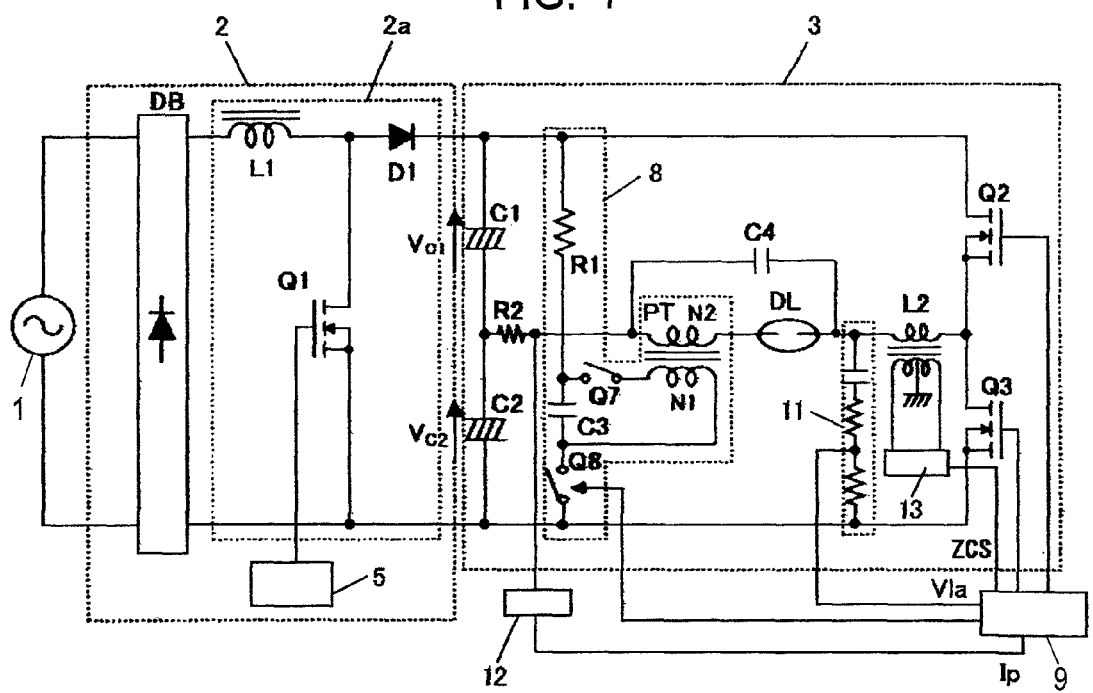
FIG. 7 is a circuit diagram of a discharge lamp lighting device in a second embodiment.

FIG. 7 is a circuit diagram of a lighting device according to a second embodiment of the invention. In this embodiment, a half-bridge inverter circuit is used as the power convertor circuit 3. The half-bridge inverter circuit includes the following components: a series circuit of electrolytic capacitors C1 and C2, and a series circuit of the switching elements Q2 and Q3 which are connected to the an output of the DC power supply circuit 2 in parallel; a series circuit of the inductor L2 and capacitor C4 which is connected between contacts of the capacitors C1 and C2 and contacts of the switching elements Q2 and Q3 via the current sensing resistor R2; and the discharge lamp DL is connected in parallel with the capacitor C4 via the secondary coil N2 of the pulse transformer PT. The half-bridge inverter functions both as the step-down chopper circuit 6 and the inverter 7. The series circuit of the inductor L2 and the capacitor C4 constitutes a low-pass filter circuit for the step-down chopper circuit. A low frequency rectangular wave voltage is produced at opposite ends of the capacitor C4 when a period T1 and a period T2 alternate at low frequencies of several ten to several hundred Hertz frequency. In the period T1, the switching element Q2 is turned on and off at high frequencies of several ten to several hundred kHz in response to the control signal from the control circuit 9. In the period T2, the switching element Q3 is turned on and off at high frequencies of several ten to several hundred kHz in response to the control signal from the control circuit 9.

The control circuit 9 detects the lamp voltage Vla using a lamp voltage detecting circuit 11, and detects an instant value Ip of the current flowing through the switching elements Q2 and Q3 by means of the chopper current detecting circuit 12. Further, the control circuit 9 detects the zero-cross signal (ZCS) flowing through the inductor L2 by means of the zero-cross signal detecting circuit 13. The control circuit 9 controls the switching elements Q2 and Q3 in response to the detected results. The igniter circuit 8 is configured similarly to that employed in the first embodiment. However, in this embodiment, the igniter circuit 8 is connected to the output of the DC power supply circuit via the switching element Q8 whose operation is controlled in response to the control signal from the control circuit 9.

In this embodiment, the lighting device undergoes the no load mode, startup mode and steadily lighting mode as shown in FIG. 2 from the unstable mode till the steadily lighting mode of the discharge lamp.

Figure 9:
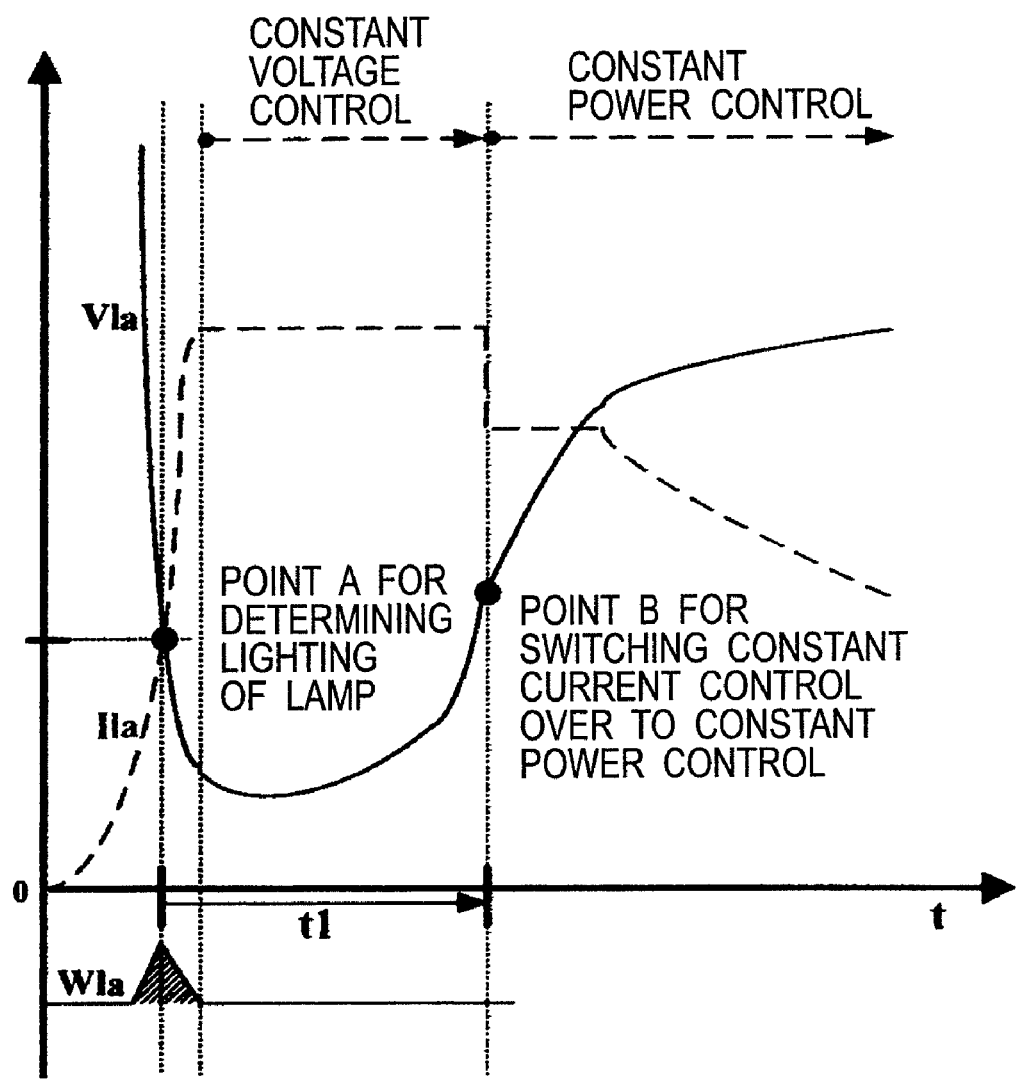
FIG. 9 is a chart showing variations of a lamp voltage from the dielectric breakdown till the steadily lighting mode, and a control switching point in the second embodiment of the invention.

FIG. 9 shows the foregoing three modes of the discharge lamp from the dielectric breakdown till the steadily lighting. The abscissa denotes a time axis.

<<Constant Current Control>>

Figure 8:
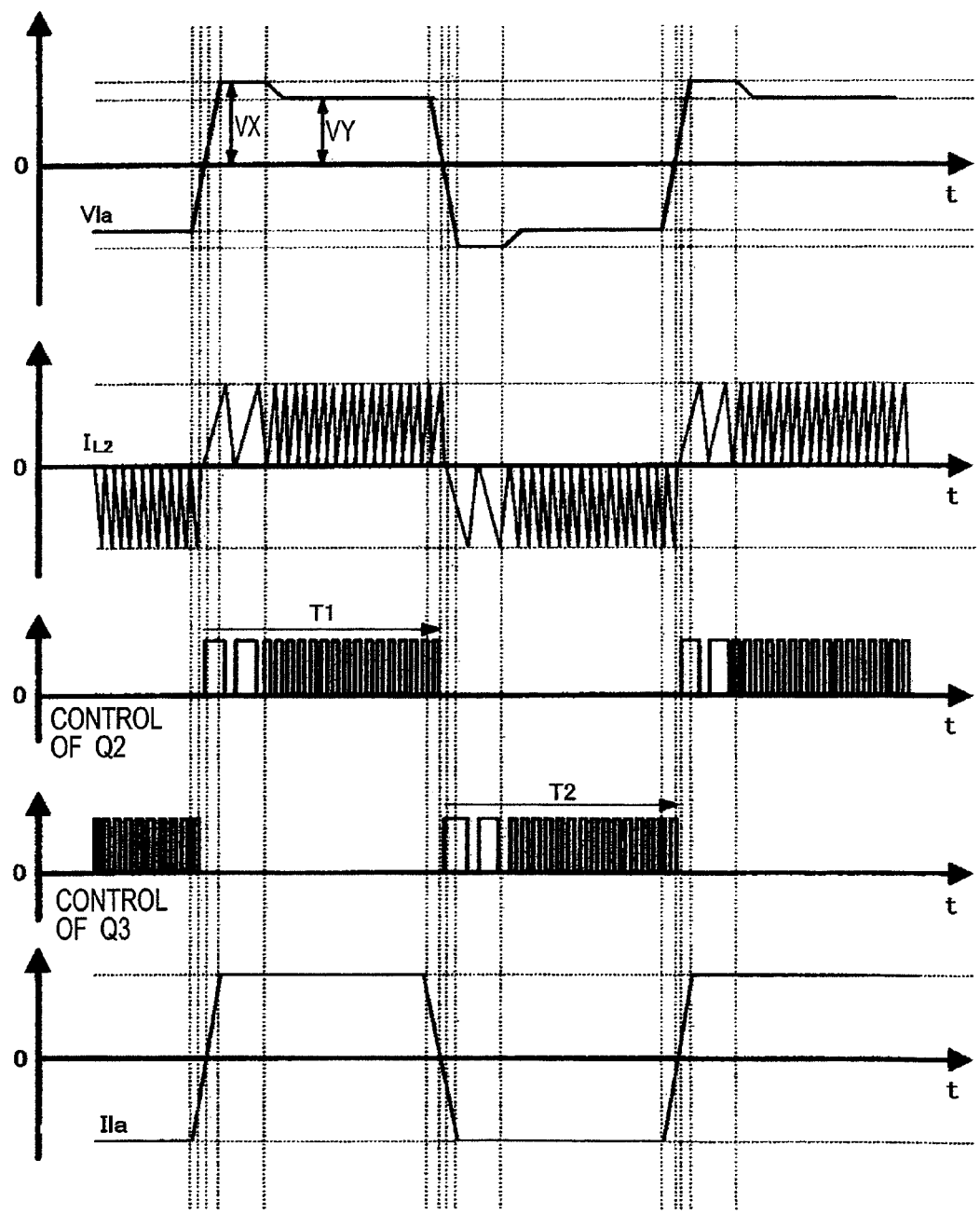
FIG. 8 shows waveforms of respective circuits during the constant current control.

After the dielectric breakdown of the discharge lamp, the control circuit 9 detects a decrease of the lamp voltage Vla. The discharge lamp is judged to be lit when the point A, where the lamp voltage Vla is equal to or lower than the predetermined threshold value, is detected. The point A is used to judge whether or not the discharge lamp is lit. In this state, a peak of the current is controlled to be constant so that the current having the target amount Tip is reliably applied to the switching element Q2 (or Q3) in each switching cycle. Refer to FIG. 5. This operation is shown in FIG. 8.

In the period T1, the switching element Q2 is turned on in response to a command from the control circuit 9, and the current begins to flow through the inductor L2. When the chopper current Ip from the current sensing resistor R2 becomes equal to the target current value Tip detected by the chopper current sensing circuit 12, the switching element Q2 is turned off. Thereafter, when the zero-cross signal ZCS is detected to be zero by the secondary coil of the inductor L2, the control circuit 9 issues a signal to activate the switching element Q2. The foregoing operations will be repeated hereinafter.

During the period T2, the switching element Q3 is turned on in response to the command from the control circuit 9, so that the current flows through the inductor L2 in the opposite direction. When the chopper current Ip from the current sensing resistor R2 is detected to be equal to the target current value TIp, the switching element Q2 is turned off. Thereafter, when the zero-cross signal ZCS is detected to be zero by the secondary coil of the inductor L2, a signal is issued in order to turn the switching element Q2 on. The foregoing operations are repeated.

The high frequency switching operations in the periods T1 and T2 are alternately carried out at the low frequency. The rectangular wave lamp voltage Vla is applied to the opposite ends of the discharge lamp as shown in FIG. 8, so that the rectangular wave lamp current Ila flows.

<<Constant Power Control>>

When a predetermined period t1 elapses after the discharge lamp is lit, the control is switched over from the constant current control to constant power control, which is second control. In order to stablize the discharge lamp with desired power within the rated lighting voltage, the switching elements Q2 and Q3 is turned on with the predetermined ON period according to the detected Vla.

In the second embodiment, the state of the gas sealed in the discharge lamp is unstable in the startup mode, and the current does not smoothly flow to the discharge lamp because the lamp impedance is increased immediately after the polarity reversal. However, the present invention can provide the high-pressure discharge lamp lighting device, in which the necessary current can flow in this state, the discharge lamp can be reliably lit each time the polarity reversal is carried out, the output voltage of the booster chopper circuit 2a is set to be low, and withstand voltage of the components can be lowered.

Third Embodiment

Figure 10:
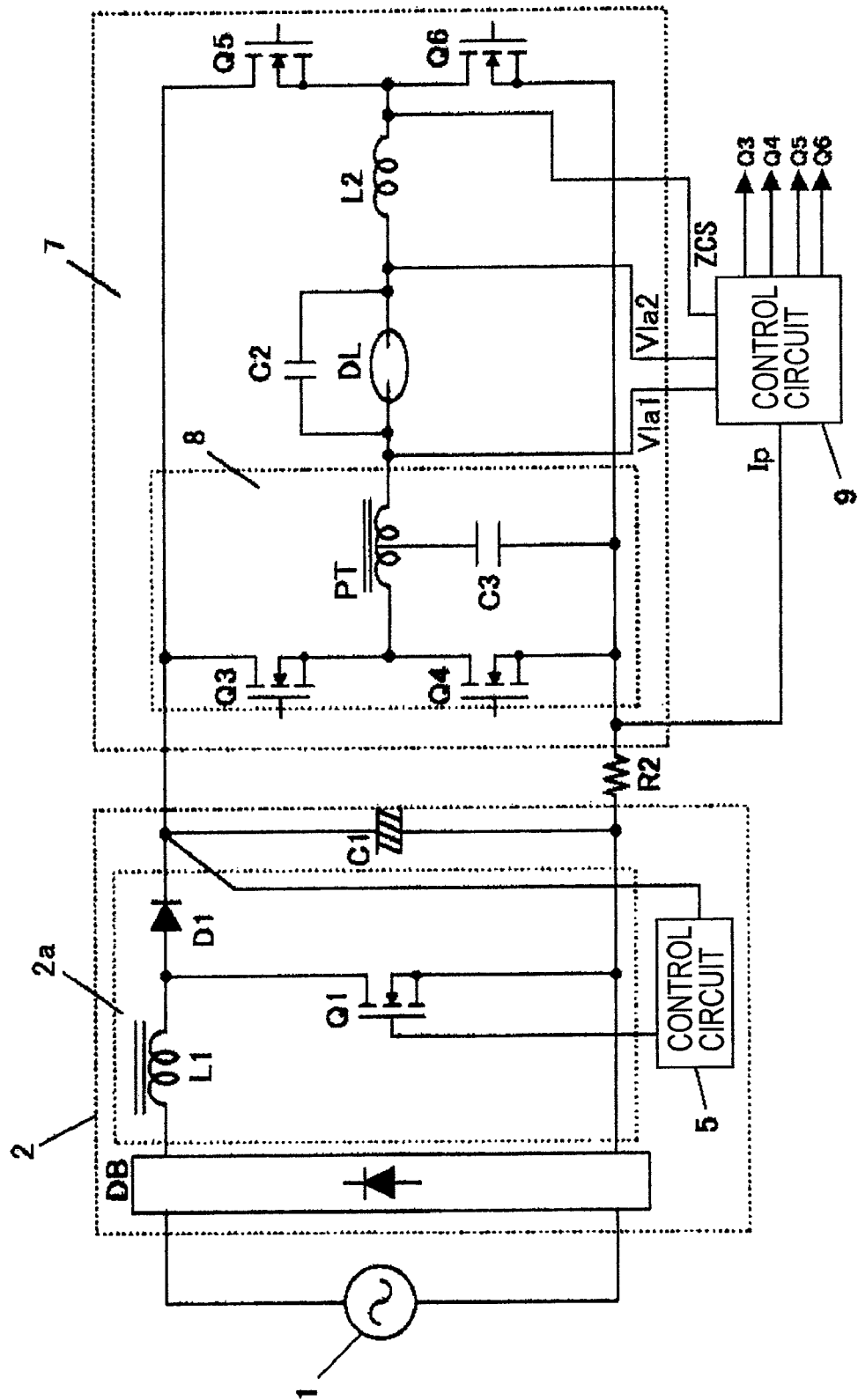
FIG. 10 is a circuit diagram of a discharge lamp lighting device according to a third embodiment.

FIG. 10 is a circuit diagram of a lighting device according to a third embodiment of the invention. In this embodiment, a full-bridge inverter circuit 7 is used as the power converter circuit, and also functions as the booster chopper circuit 6 and the igniter circuit 8 by artfully controlling the switching elements Q3 to Q6. Specifically, the switching elements Q3 and Q4 are turned on and off at the high frequency in the no load mode, which enables a resonant booster circuit 8 to generate a high voltage and dielectrically breaks down the discharge lamp DL. The resonant booster circuit 8 is constituted by a transformer PT and a capacitor C3 inserted across an intermediate tap of the transformer Pt and the earth. From the startup mode till the steadily lighting mode of the discharge lamp, the switching elements Q3 and Q4 are turned on and off at the low frequency, which enables the resonant booster circuit 8 to stop generating the high voltage. During the period T1 where the switching element Q4 is active, the switching elements Q5 and Q6 are alternately is turned on and off. Specifically, the switching element Q5 is turned on and off at the high frequency while the switching element Q6 is turned on and off at the low frequency. The low frequency rectangular wave voltage is supplied to the discharge lamp DL. In this state, the inductor L2 and the capacitor C2 function as a low-pass filter for the booster chopper circuit.

The control circuit 9 detects the lamp voltage Vla on the basis of the voltages Vla1 and Vla2 at the opposite ends of the discharge lamp, and the instant value Ip of the chopper current flowing to the switching elements Q5 and Q6 from the current sensing resistor R2. Further, the control circuit 9 detects the zero-cross signal ZCS in the current flowing to the inductor L2. Still further, the control circuit 9 controls the switching elements Q3 to Q6 in order to supply the desired current or voltage to the discharge lamp on the basis of the detected results.

Figure 11:
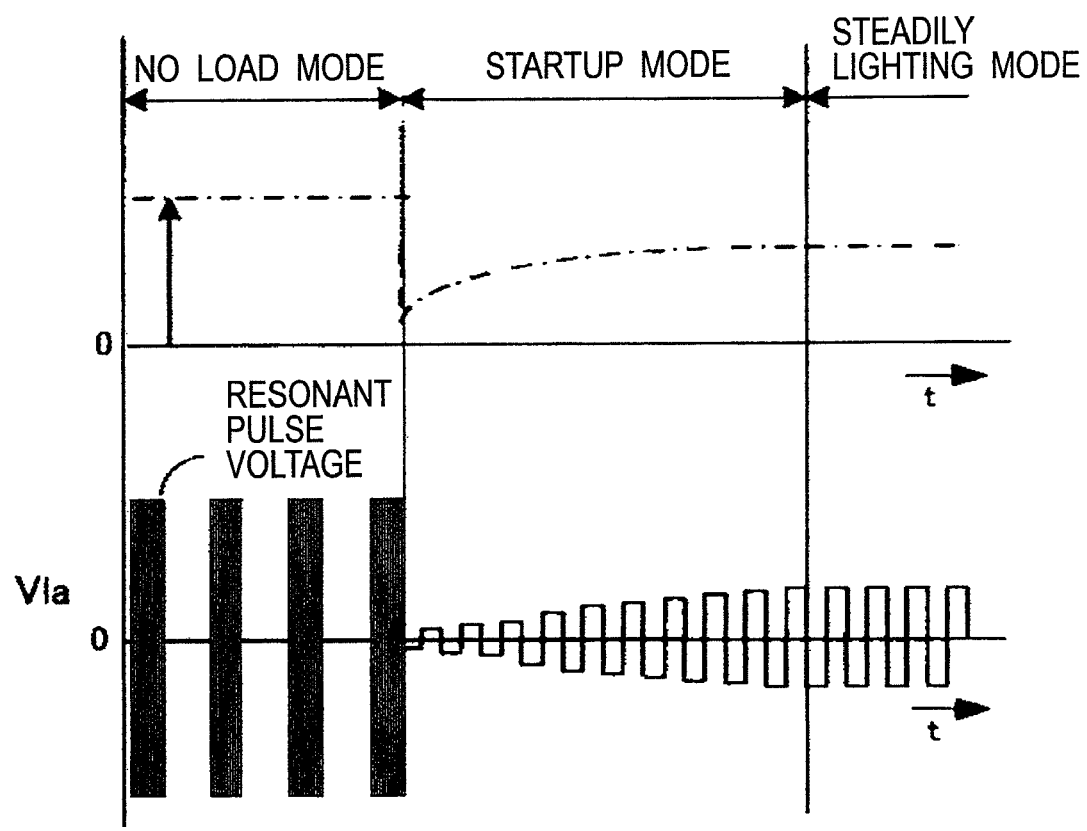
FIG. 11 is a diagram showing processes from the no load mode till the steadily lighting mode in the third embodiment of the invention.

Referring to FIG. 11, the control circuit 9 lets the lighting device undergo three modes from the unlit state till the steadily lighting mode of the high voltage discharge lamp.

No load mode: The discharge lamp remains unlit. A resonant pulse voltage, which is generated by turning on and off the switching elements Q3 and Q4 approximately at an LC resonant frequency of the primary coil of the transformer PT and the capacitor C3, is boosted on the basis of a turn ratio of the transformer PT, and is supplied across the electrodes of the discharge lamp. The discharge lamp undergoes the dielectric breakdown, and is put in the startup mode.

[Startup Mode]

After the dielectric breakdown, the discharge lamp undergoes shifts to the arc discharge from the glow discharge. While the discharge lamp becomes stable after the arc discharge is started and a temperature inside the discharge tube becomes uniform, the lamp voltage of several volts is gradually raised to the stable voltage in several minutes.

Steadily lighting Mode: After the discharge lamp is lit, the temperature inside the discharge tube is raised in several minutes. The discharge lamp becomes stable, and the lamp voltage becomes approximately constant.

Figure 12:
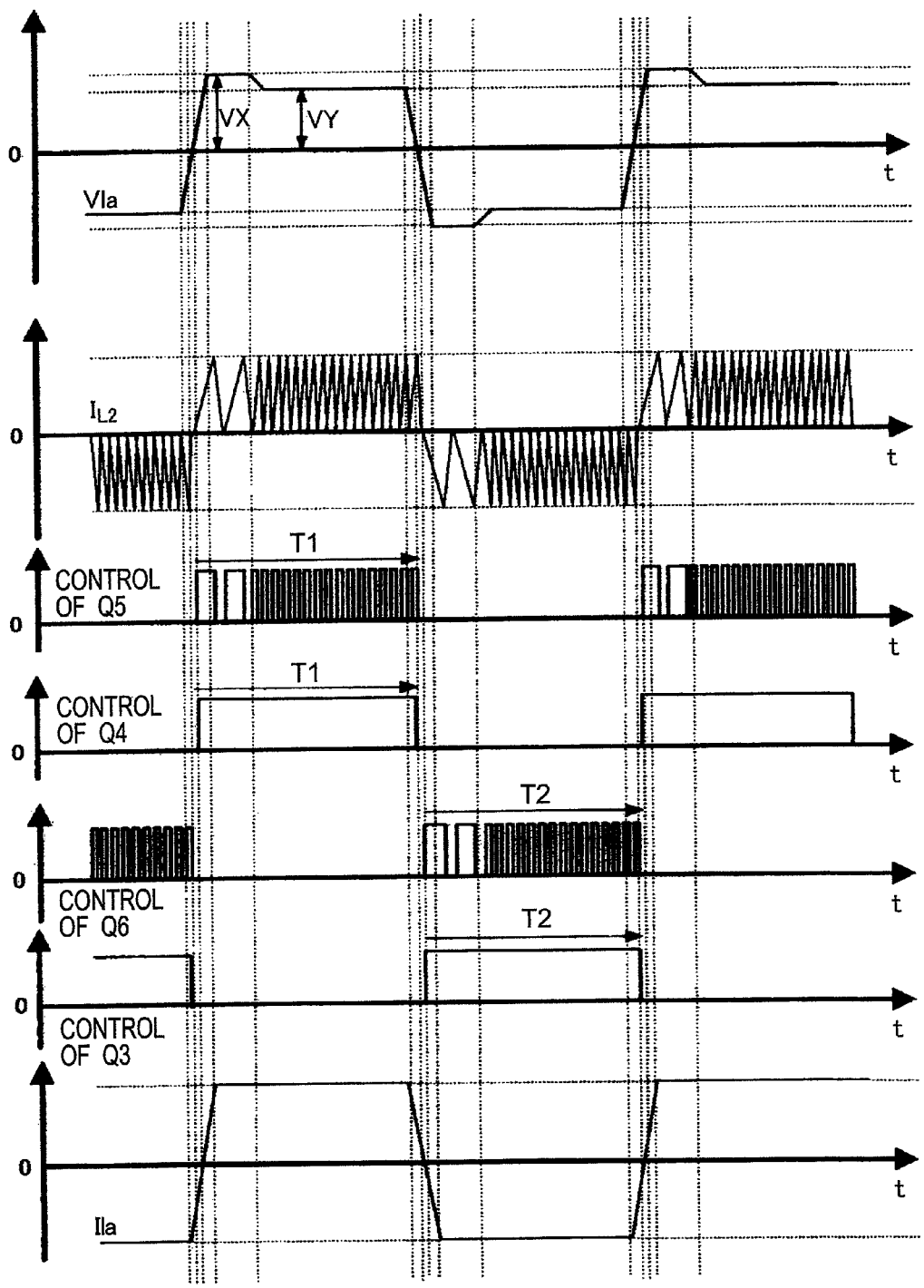
FIG. 12 shows waveforms of respective circuits during the constant current control.

FIG. 12 shows waveforms of various circuits in the startup mode or the steadily lighting mode. The control circuit 9 controls the switching elements Q3 to Q6 in the inverter circuit 7 as described hereinafter. The periods T1 and T2 alternate at low frequencies of several ten to several hundreds Hz. During the period T1, the switching element Q5 is turned on and off at the frequencies of several ten to several hundreds kHz while the switching element Q4 remains active. During the period T2, the switching element Q6 is turned on and off at the frequencies of several ten to several hundreds kHz while the switching element Q3 remains active. A chopping wave $I_{L2}$ is generated in response to the chopping of the switching elements Q5 and Q5 as shown in FIG. 12. The current Ila smoothed by the capacitor C2 is applied to the load circuit. The chopping wave $I_{L2}$ is a current flowing to the inductor L2, and gradually increases while the switching element Q2 is active, and gradually decreases while the switching element Q2 is inactive.

Figure 13:
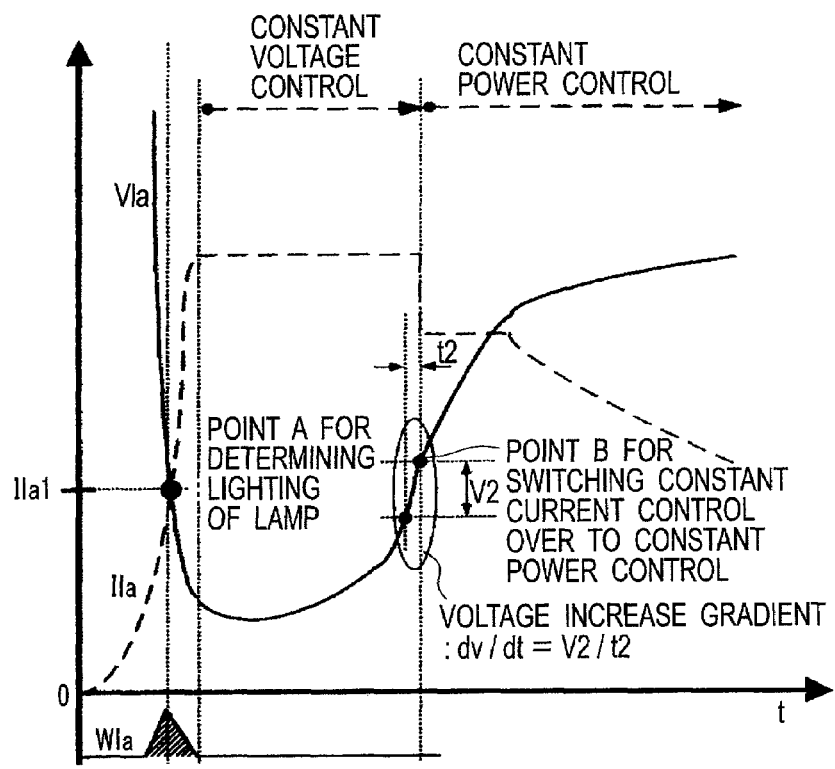
FIG. 13 is a chart showing variations of a lamp voltage from the dielectric breakdown till the steadily lighting mode, and a control switching point in a third embodiment of the invention.

The modes from the dielectric breakdown till the steadily lighting mode of the discharge lamp will be described in detail with reference to FIG. 13. In FIG. 13, the abscissa denotes the time axis.

<<Constant Current Control>>

After the dielectric breakdown of the discharge lamp, an increase of the lamp current Ila is detected. When detecting the lighting judging point A where the increased lamp current is equal to or larger than the threshold Ila1, the discharge lamp is judged to be lit. From this time point, the peak of the increased lamp current is controlled to be constant so that the current having the target amount TIp reliably flows during each chopping period of the switching element Q5 or Q6. Refer to FIG. 5 with respect to the target amount Tip in the current curve.

The switching element Q4 is kept active during the period T1 while the switching element Q5 is controlled as follows. The switching element Q5 is turned on in response to the command from the control circuit 9, and the current begins to flow to the inductor L2. When the chopper current Ip detected by the current sensing resistor R2 becomes equal to the target current value TIp (shown in FIG. 5), the switching element Q5 is turned off. The zero-cross signal ZCS is detected based on a potential at an intersection of the switching elements Q5 and Q6, so that the control circuit 9 issues the signal to turn on the switching element Q5. The foregoing operations will be repeated.

During the period T2, the switching element Q3 is kept active while the switching element Q6 is controlled as follows. The switching element Q6 is turned on in response to the command from the control circuit 9, and the current begins to flow to the inductor L2. When the chopper current Ip from the current sensing resistor R2 is detected to be equal to the target current value Tip (shown in FIG. 5), the switching element Q6 is turned off. The zero-cross signal ZCS is detected based on a potential at an intersection of the switching elements Q5 and Q6, so that the control circuit 9 issues the signal to turn on the switching element Q6. The foregoing operations will be repeated.

The periods T1 and T2 alternate at the low frequencies. The rectangular lamp voltage Vla is applied the opposite ends of the discharge lamp, so that the rectangular wave lamp current Ila flows to the discharge lamp. Refer to FIG. 12.

<<Constant Power Control>>

An increase gradient of the lamp voltage is detected. When the detected increase gradient becomes equal to a predetermined increase gradient (V2/t2), the constant current control is changed over to the constant power control, or second control, at the control change point B. In order to light the discharge lamp with desired electric power within the rated lighting voltage, the switching elements Q5 and Q6 undergo chopping control during the operation period determined for each detected value of the lamp voltage Vla, as shown by the Vla–TWla curve shown in FIG. 5.

In the third embodiment, the state of the gas sealed in the discharge lamp is unstable when the discharge lamp is in the startup mode, and the current does not smoothly flow to the discharge lamp because the lamp impedance is increased immediately after the polarity reversal. However, the present invention can provide the high voltage discharge lamp lighting device, in which the necessary current can flow in the foregoing state, the discharge lamp can be reliably lit each time the polarity reversal is carried out, the output voltage of the booster chopper circuit 2a is set to be low, and withstand voltage of the circuits can be lowered.

Fourth Embodiment

Figure 14:
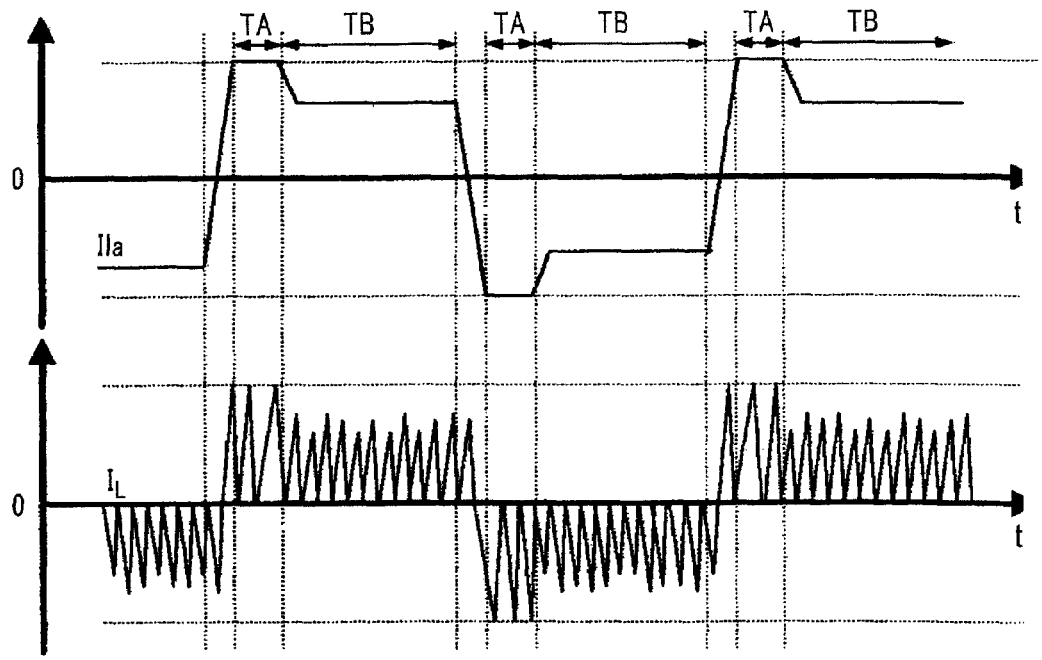
FIG. 14 shows waveforms of respective circuits during the constant current control in a fourth embodiment.

FIG. 14 relates to a fourth embodiment. In this embodiment, the constant current control during the startup and unstable states of the discharge lamp is performed as shown in FIG. 14, compared to the constant current control in the first to the third embodiments. There are a period TA immediately after each polarity reversal, and a period TB between the end of the period TA and next polarity reversal. The constant current control is carried out only during the period TA. This embodiment is as advantageous as the first to third embodiments.

The constant current control is carried out only immediately after the polarity reversal where the discharging state of the discharge lamp is most unstable. Even if the gas sealed in the discharge lamp is unstable during the startup of the discharge lamp and even if the current is slow to flow to the discharge lamp due to an increase of the lamp impedance, the necessary current can be supplied. This enables the discharge lamp to be reliably lit each time the polarity reversal is conducted, the output voltage of the chopper circuit to be lowered, and the circuits to have lowered withstand voltages.

Fifth Embodiment

Figure 15:
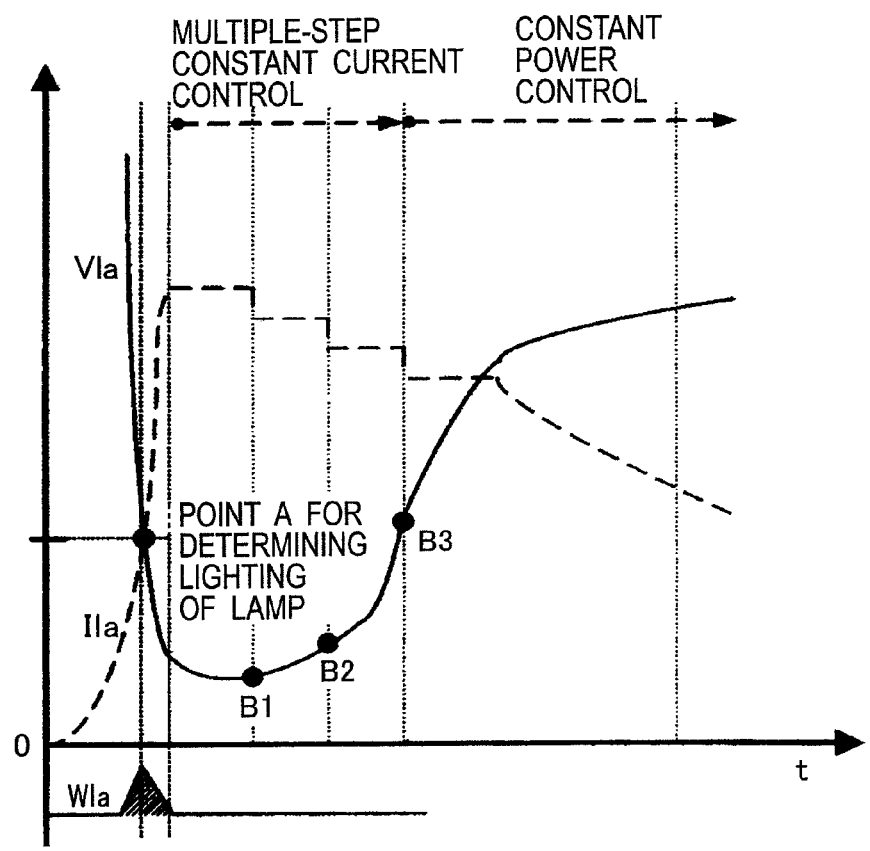
FIG. 15 is a chart showing variations of a lamp voltage from the dielectric breakdown till the steadily lighting mode, and a control switching point in a fifth embodiment of the invention.

FIG. 15 relates to a fifth embodiment of the invention. In this embodiment, it is possible that a plurality of target current values are set for the constant current control in order to decrease the target currents in response to state changes of the discharge lamp (e.g. voltage increase), compared to the constant current control in the first to third embodiments. In an example shown in FIG. 15, as the lamp voltage is raised, the target current value is changed to a lower value at a point B1, B2 or B3. Therefore, it is possible to reliably light the discharge lamp each time the polarity is reversed, and a load on the discharge lamp can be reduced.

Sixth Embodiment

Figure 16:
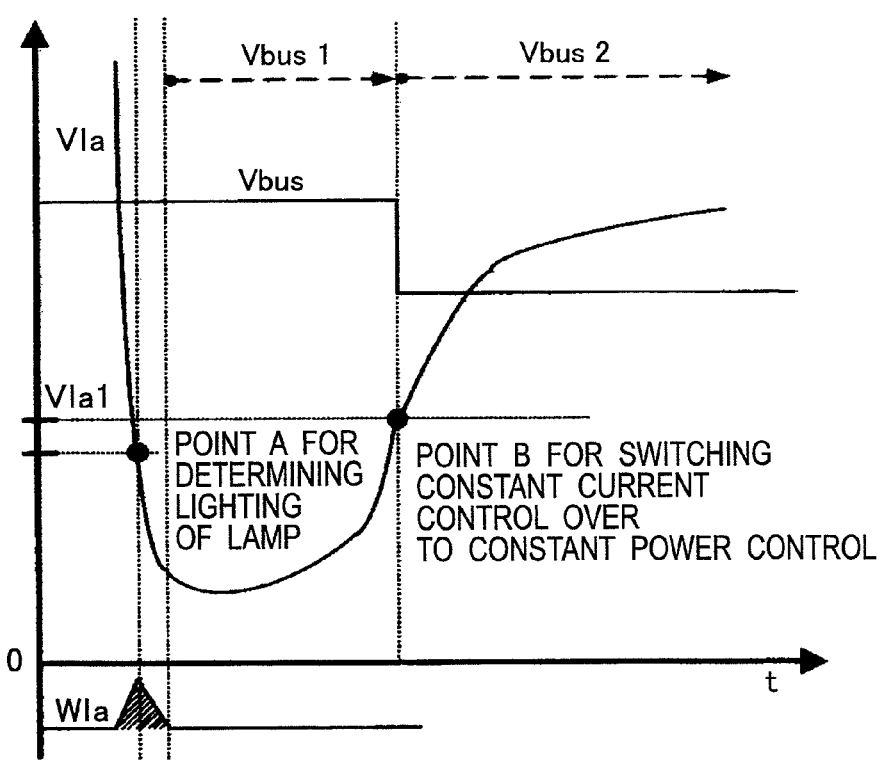
FIG. 16 is a chart showing variations of a lamp voltage from the dielectric breakdown till the steadily lighting mode, and a control switching point in a sixth embodiment of the invention.
Figure 17:
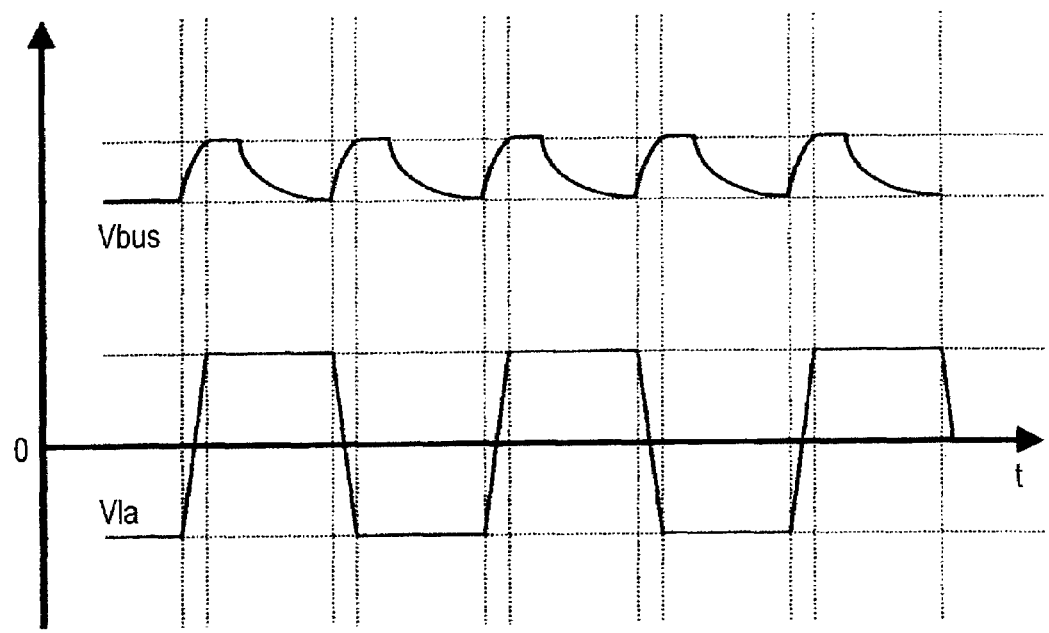
FIG. 17 shows waveforms of respective circuits during a constant current control mode in a sixth embodiment.

FIG. 16 and FIG. 17 relate to a sixth embodiment. When a DC power supply voltage Vbus during the constant current control is raised above the voltage values during the lighting period, compared to the constant current control in the first to fifth embodiments. The lamp impedance is increased immediately after the polarity reversal. Even if the current is slow to flow to the discharge lamp, it is possible to further improve the constant current supplying capability of the circuits. Further, during the control for increasing the DC power supply voltage Vbus only after the polarity reversal in the constant current control shown in FIG. 17, the sixth embodiment is as effective and advantageous as in the foregoing embodiments. Further, in order to temporally increase the DC power supply voltage Vbus as shown in FIG. 16 or FIG. 17, the control circuit 9 is required only to send the control signal to the control circuit 5 of the DC power supply circuit 2.

Seventh Embodiment

Figure 18:
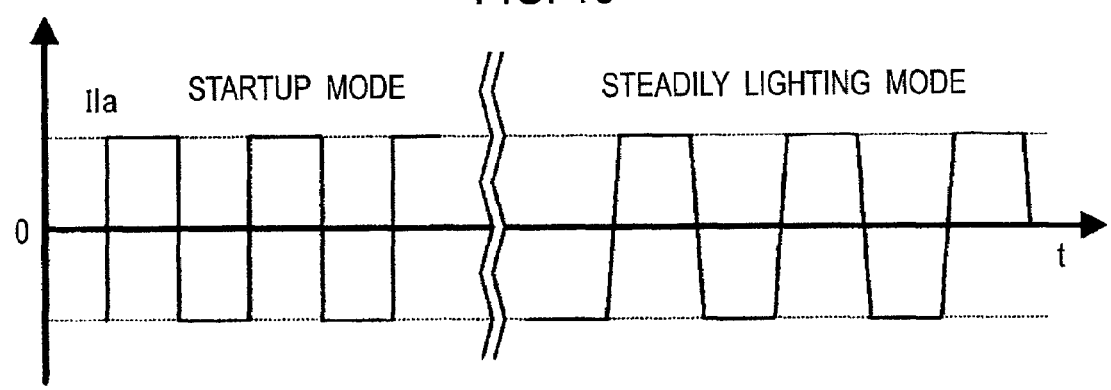
FIG. 18 is a chart showing variations of a lamp voltage from the dielectric breakdown till the steadily light mode, and a control switching point in a seventh embodiment of the invention.

FIG. 18 relates to a seventh embodiment. An optimum polarity reversal speed in the steadily lighting mode depends upon wattage or a kind of the discharge lamp, and is preferably 300 μsec or less. Especially, during the constant current control in which the discharge lamp is in an unstable lighting state, the polarity reversal is quickly carried out (in approximately 100 μsec). On the other hand, if the polarity reversal is quickly carried out in the steadily lighting mode, a stem of the discharge lamp sometime tends to vibrate, and generate noise. In order to overcome this problem, the polarity reversal speed is changed at the same time when the constant current control during the startup mode is changed over to the constant power control in the steadily lighting mode. This enables the discharge lamp to be reliably lit at the startup period and remain lit without generating noise in the steadily lighting mode.

Eighth Embodiment

Figure 19:
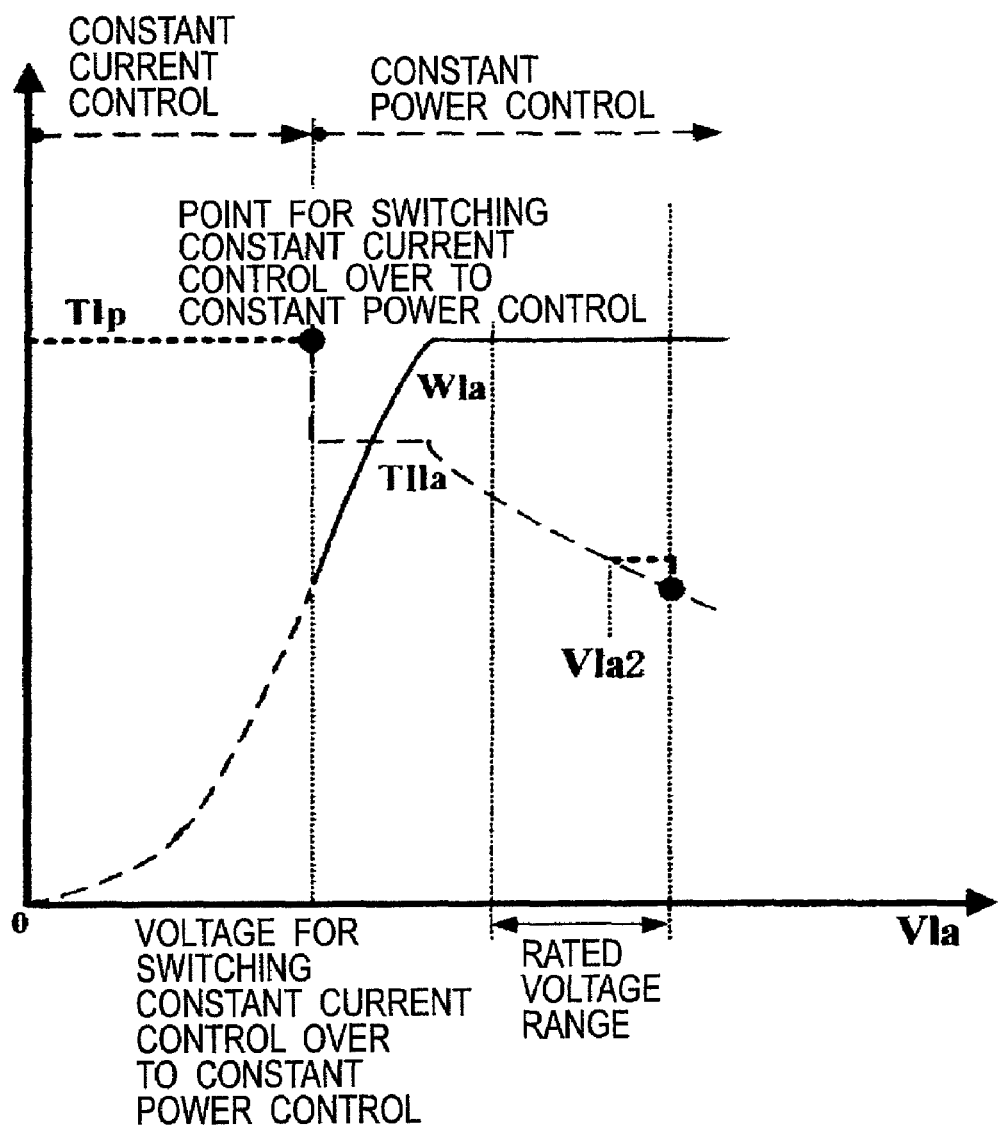
FIG. 19 is a characteristic diagram showing lamp power with respect to a lamp voltage, and a target control value of a lamp current.

FIG. 19 relates to an eighth embodiment. The lamp voltage is increased near the end of the lifetime of the discharge lamp. Since an amount of the current supplied to the discharge lamp is decreased as shown by a Vla–Wla curve in FIG. 19, the discharge lamp tends to fade out. In order to assure the steadily lighting mode of the discharge lamp which is lit at an approximately maximum voltage of the rated lamp voltage, a threshold value Vla2 is set in the high voltage range Vla as shown in FIG. 19. The discharge lamp which is lit within the rated voltage range above the threshold value is determined to undergo the constant current control. This enables the discharge lamp to remain lit for a long period of time, and protects the discharge lamp having a maximum rated light voltage against fading out.

Ninth Embodiment

Figure 20:
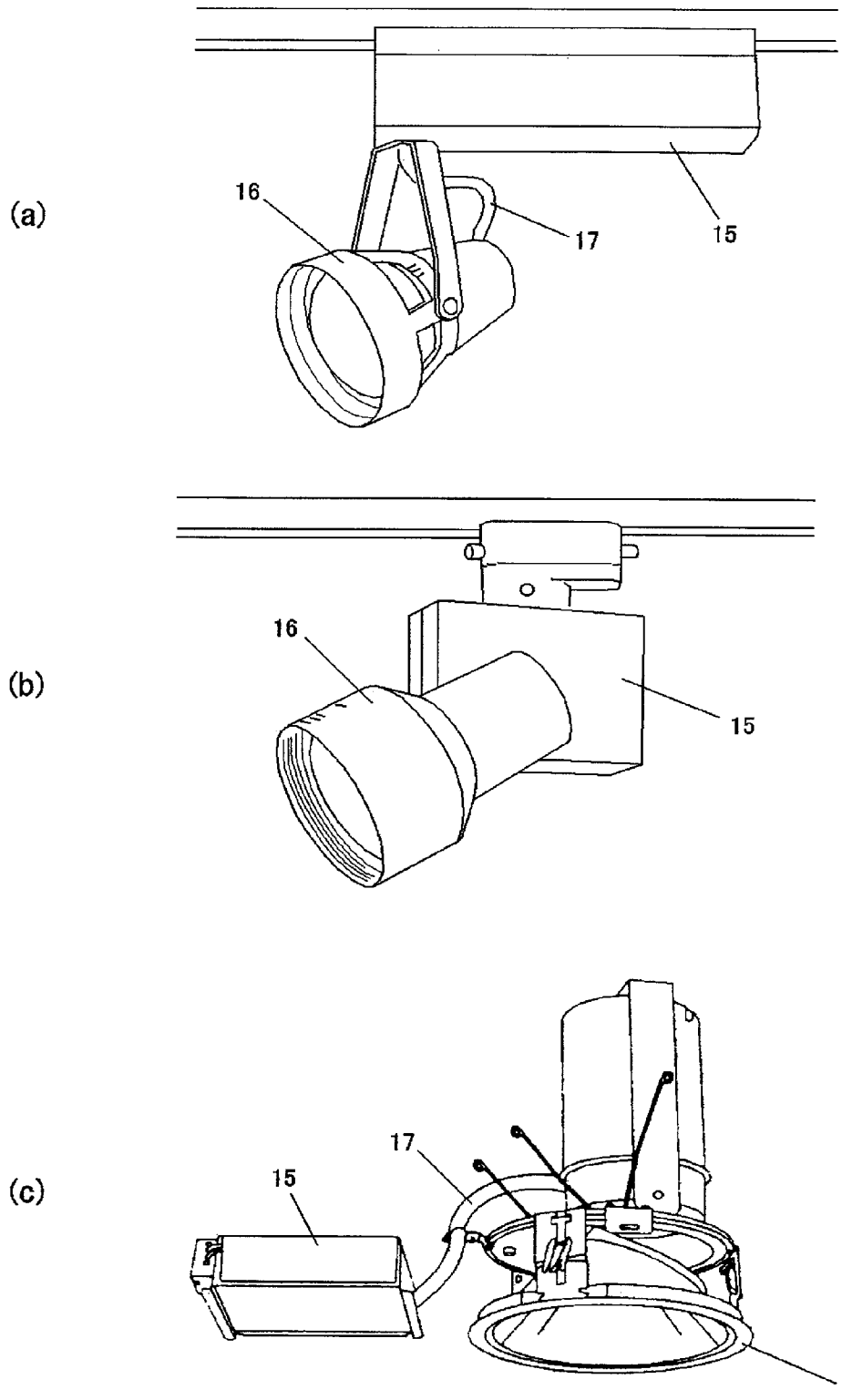
FIG. 20 shows external appearances of lighting fixtures in a ninth embodiment of the invention.
Figure 21:
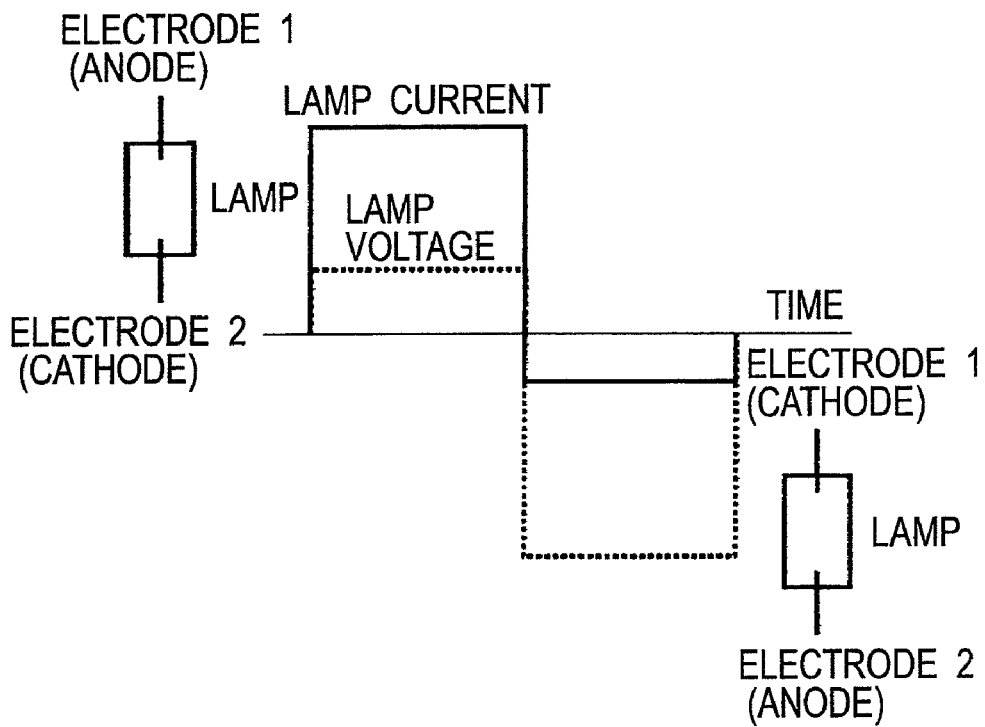
FIG. 21 shows waveforms of rectifiyng discharge currents of a high-pressure discharge lamp of the related art.
Figure 22:
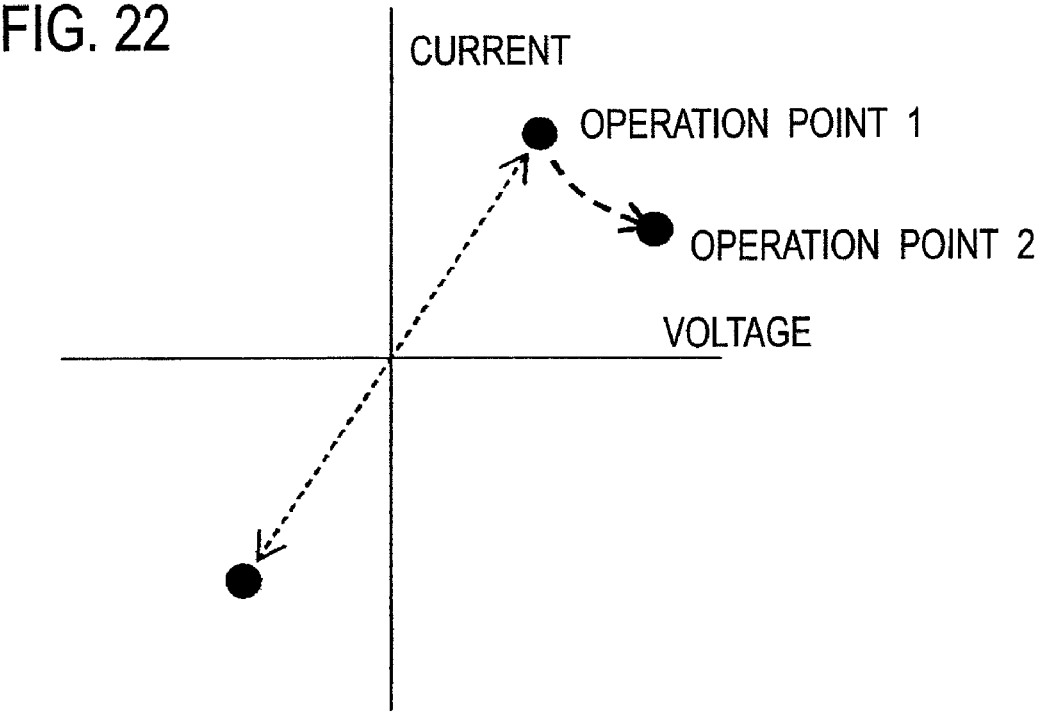
FIG. 22 shows transient line impedance characteristic 1 of the related art.
Figure 23:
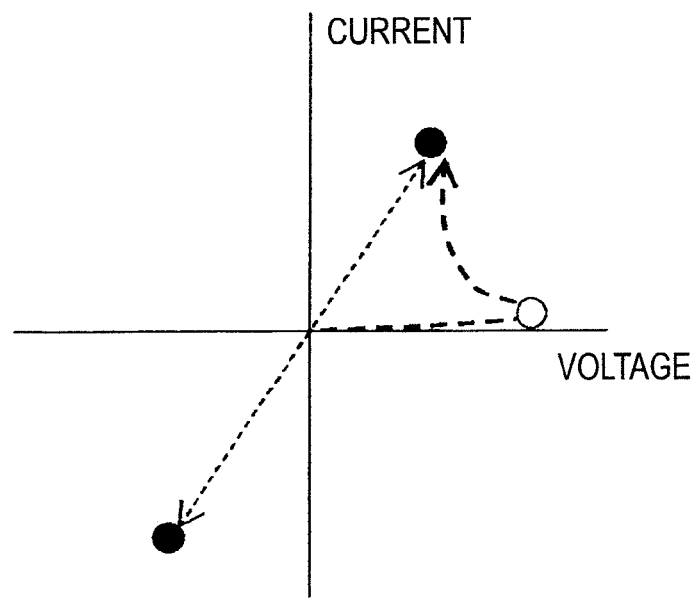
FIG. 23 shows transient line impedance characteristic 2 of the related art.
Figure 24:
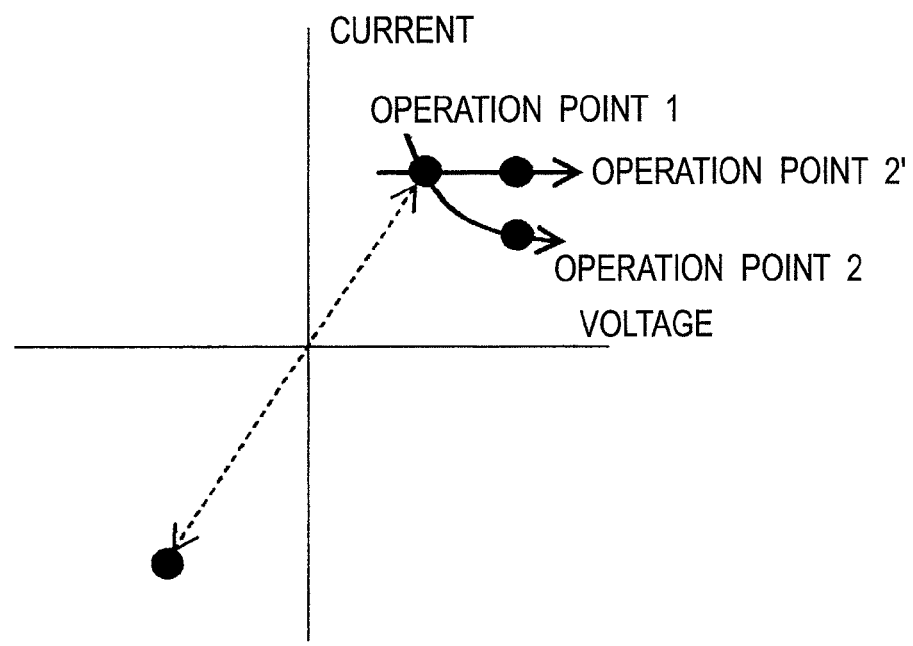
FIG. 24 shows transient line impedance characteristic 3 of the related art.
Figure 25:
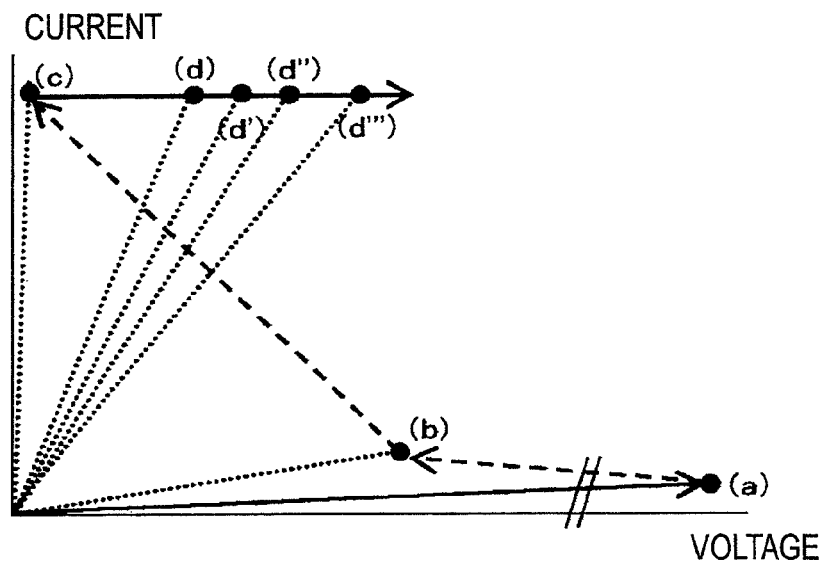
FIG. 25 shows line impedance characteristics at the time of startup, during a steadily lighting mode, and at the end of life of a discharge lamp in the related art.

FIG. 20 shows lighting fixtures for trucks, which include the high voltage discharge lamp lighting devices according to the present invention. Specifically, FIGS. 25(a) and 25(b) show examples in which HID lamps are used as spot lights. FIG. 20(c) shows a lighting device in which the HID lamp is used as a downlight. In FIG. 20, reference numeral 15 denotes an electronic ballast which houses circuits of a lighting device, reference numeral 16 denotes a lamp body provided with a high voltage discharge lamp, and reference numeral 17 is a wiring. A plurality of the foregoing lighting fixtures may be used in combination in order to constitute a lighting system. The high voltage discharge lamps according to the first to eighth embodiments assure reliable lighting of the lighting fixtures and prevent the discharge lamps from fading out.

INDUSTRIAL APPLICABILITY

According to the invention, it is possible to reliably supply currents necessary for respective switching cycles from the startup state till the end of lifetime of the discharge lamp. The discharge lamp is protected against fading out due to insufficient current supply. Further, it is possible to reduce voltages of the circuits by decreasing the output voltage of the DC power supply.

The invention claimed is:

1. A high-pressure discharge lamp lighting device comprising:
   a power converter circuit which includes a plurality of switching elements and an inductance element, converts an input from a DC power supply, and supplies a rectangular wave AC output to a high-pressure discharge lamp;
   a control circuit which controls the switching elements of the power converter circuit, wherein
   the control circuit performs a first lighting control in which the switching elements of the power converter circuit are controlled to supply current to a predetermined constant peak value in each switching cycle of the switching elements, and performs a second lighting control in which desired power is supplied during a steadily lighting state of the high-pressure discharge lamp; and
   the control circuit switches the first lighting control and the second lighting control in each half-cycle of the rectangular wave AC in response to a lighting state of the high-pressure discharge lamp.

2. The high-pressure discharge lamp lighting device according to claim 1, wherein the control circuit detects lighting of the high-pressure discharge lamp on the basis of a decrease of a lamp voltage or an increase of a lamp current, or as a product of instant values of the lamp voltage and the lamp current.

3. The high-pressure discharge lamp lighting device according to claim 1, wherein a plurality of target values are set for the first lighting control, and a desired target value is used in response to the increase of the lamp voltage.

4. The high-pressure discharge lamp lighting device according to claim 1, wherein the control circuit performs the first lighting control immediately after lighting of the high-pressure discharge lamp is detected, and changes the first light control over to the second lighting control after a lapse of a predetermined time period following the lighting of the high-pressure discharge lamp.

5. The high-pressure discharge lamp lighting device according to claim 4, wherein the first lighting control is performed for the predetermined time period after polarity reversal of a rectangular wave in place of the first lighting control immediately after the detection of the lighting of the high-pressure discharge lamp, and performs the second lighting control for a time period till next polarity reversal; and the first lighting control and the second lighting control are repeated.

6. The high-pressure discharge lamp lighting device according to claim 1, wherein the control circuit performs the first lighting control immediately after lighting of the high-pressure discharge lamp is detected, and changes the first lighting control over to the second lighting control after a predetermined lamp voltage is reached or when an increase gradient of the lamp voltage within a predetermined time period is equal to a predetermined gradient.

7. The high-pressure discharge lamp lighting device according to claim 1, wherein an output voltage of the DC power supply is high during the first lighting control compared with that during the second lighting control.

8. The high-pressure discharge lamp lighting device according to claim 1, wherein an output voltage of the DC power supply is high for a certain time period immediately after the polarity reversal.

9. The high-pressure discharge lamp lighting device according to claim 1, wherein the polarity reversal is performed faster during the first lighting control compared with the polarity reversal during the second lighting control.

10. A lighting fixture including the high-pressure discharge lamp lighting device according to claim 1.

* * * * *